United States Patent
Jobs et al.

(10) Patent No.: US 11,314,378 B2
(45) Date of Patent: Apr. 26, 2022

(54) PERSISTENT GROUP OF MEDIA ITEMS FOR A MEDIA DEVICE

(71) Applicant: Apple Inc., Cupertino, CA (US)

(72) Inventors: Steven P. Jobs, Palo Alto, CA (US); Jeffrey L. Robbin, Los Altos, CA (US); David Heller, San Jose, CA (US)

(73) Assignee: Apple Inc., Cupertino, CA (US)

( * ) Notice: Subject to any disclaimer, the term of this patent is extended or adjusted under 35 U.S.C. 154(b) by 436 days.

(21) Appl. No.: 15/202,398

(22) Filed: Jul. 5, 2016

(65) Prior Publication Data
US 2017/0068404 A1    Mar. 9, 2017

Related U.S. Application Data

(63) Continuation of application No. 11/097,034, filed on Apr. 1, 2005, now Pat. No. 9,412,417.
(Continued)

(51) Int. Cl.
*G06F 3/0482*    (2013.01)
*G06F 3/16*    (2006.01)
(Continued)

(52) U.S. Cl.
CPC ............ *G06F 3/0482* (2013.01); *G06F 3/162* (2013.01); *G06F 3/165* (2013.01);
(Continued)

(58) Field of Classification Search
CPC ........ G06F 3/0482; G06F 3/162; G06F 3/165; G06F 17/30053; G06F 17/30058;
(Continued)

(56) References Cited

U.S. PATENT DOCUMENTS 3,990,710 A    11/1976    Hughes
4,528,643 A    7/1985    Freeny, Jr.
(Continued)

FOREIGN PATENT DOCUMENTS

EP    0917077 A1    5/1999
EP    0982732 A1    3/2000
(Continued)

OTHER PUBLICATIONS

Apple Announces iTunes 2,' Press Release, Apple Computer, Inc., Oct. 23, 2001.
(Continued)

*Primary Examiner* — Tadesse Hailu
*Assistant Examiner* — Darrin Hope
(74) *Attorney, Agent, or Firm* — Blank Rome LLP

(57) ABSTRACT

Improved techniques to utilize and manage a group of media items (or media assets) on a computing device are disclosed. The group of media items can be utilized and managed at a host computer for the host computer as well as a media device (e.g., media player) that can couple to the host computer. One popular example of a group of media items is know as a playlist, which can pertain to a group of audio tracks. One aspect pertains to providing a persistent media device playlist at a host computer. Another aspect pertains to imposing capacity limits to a playlist, such as a media device playlist. Still another aspect pertains to a graphical user interface that enables a user to trade-off storage capacity of a media device between media asset storage and data storage. Yet still another aspect pertains to a graphical user interface that assists a user with selecting media items to fill a group of media items.

16 Claims, 11 Drawing Sheets

Related U.S. Application Data

(60) Provisional application No. 60/642,334, filed on Jan. 7, 2005.

(51) Int. Cl.
*G06F 16/44* (2019.01)
*G06F 16/438* (2019.01)
*G11B 27/031* (2006.01)
*G11B 27/11* (2006.01)
*G11B 27/34* (2006.01)
G06F 3/04817 (2022.01)
G06F 3/04847 (2022.01)
G06F 3/0486 (2013.01)

(52) U.S. Cl.
CPC .......... *G06F 16/4387* (2019.01); *G06F 16/44* (2019.01); *G11B 27/031* (2013.01); *G11B 27/11* (2013.01); *G11B 27/34* (2013.01); G06F 3/0486 (2013.01); G06F 3/04817 (2013.01); G06F 3/04847 (2013.01); G11B 2220/61 (2013.01)

(58) Field of Classification Search
CPC ............. G06F 3/04817; G06F 3/04847; G06F 3/0486; G11B 27/031; G11B 27/11; G11B 27/34; G11B 2220/61
USPC ......................................................... 715/727
See application file for complete search history.

(56) References Cited

U.S. PATENT DOCUMENTS

| | | |
|---|---|---|
| 4,851,931 A | 7/1989 | Parker |
| 5,168,481 A | 12/1992 | Culbertson |
| 5,181,107 A | 1/1993 | Rhoades |
| 5,191,573 A | 3/1993 | Hair |
| 5,341,350 A | 8/1994 | Frank |
| 5,355,302 A | 10/1994 | Martin |
| 5,418,713 A | 5/1995 | Allen |
| 5,428,735 A | 6/1995 | Kahl |
| 5,481,509 A | 1/1996 | Knowles |
| 5,504,852 A | 4/1996 | Thompson-Rohrlich |
| 5,535,381 A | 7/1996 | Kopper |
| 5,559,945 A | 9/1996 | Beaudet |
| 5,561,604 A | 10/1996 | Buckley |
| 5,566,353 A | 10/1996 | Cho |
| 5,583,993 A | 12/1996 | Foster |
| 5,587,404 A | 12/1996 | Kroner |
| 5,616,876 A | 4/1997 | Cluts |
| 5,633,839 A | 5/1997 | Alexander |
| 5,640,566 A | 6/1997 | Victor |
| 5,666,530 A | 9/1997 | Clark |
| 5,710,922 A | 1/1998 | Alley |
| 5,714,971 A | 2/1998 | Shalit |
| 5,721,949 A | 2/1998 | Smith |
| 5,726,909 A | 3/1998 | Krikorian |
| 5,727,202 A | 3/1998 | Kucala |
| 5,734,823 A | 3/1998 | Saigh |
| 5,739,451 A | 4/1998 | Winksy |
| 5,740,134 A | 4/1998 | Peterson |
| 5,745,583 A | 4/1998 | Koizumi |
| 5,751,997 A | 5/1998 | Kullick |
| 5,819,160 A | 10/1998 | Foladare |
| 5,835,721 A | 11/1998 | Donahue |
| 5,835,732 A | 11/1998 | Kikinis |
| 5,845,282 A | 12/1998 | Alley |
| 5,864,868 A | 1/1999 | Contois |
| 5,867,668 A | 2/1999 | Spirakis |
| 5,875,110 A | 2/1999 | Jacobs |
| 5,897,642 A | 4/1999 | Capossela |
| 5,918,213 A | 6/1999 | Bernard |
| 5,918,303 A | 6/1999 | Yamaura |
| 5,923,757 A | 7/1999 | Hocker |
| 5,925,843 A | 7/1999 | Miller |
| 5,926,819 A | 7/1999 | Doo |
| 5,963,916 A | 10/1999 | Kaplan |
| 5,969,283 A | 10/1999 | Looney |
| 5,983,069 A | 11/1999 | Cho |
| 5,995,098 A | 11/1999 | Okada |
| 6,000,000 A | 12/1999 | Hawkins |
| 6,006,274 A | 12/1999 | Hawkins |
| 6,034,621 A | 3/2000 | Kaufman |
| 6,038,199 A | 3/2000 | Pawlowski |
| 6,041,023 A | 3/2000 | Lakhansingh |
| 6,052,797 A | 4/2000 | Ofek |
| 6,061,306 A | 5/2000 | Buchheim |
| 6,125,369 A | 9/2000 | Wu |
| 6,138,245 A | 10/2000 | Son |
| 6,172,948 B1 | 1/2001 | Keller |
| 6,208,044 B1 | 3/2001 | Viswanadham |
| 6,216,131 B1 | 4/2001 | Liu |
| 6,243,328 B1 | 6/2001 | Fenner et al. |
| 6,243,725 B1 | 6/2001 | Hempieman et al. |
| 6,247,135 B1 | 6/2001 | Feague |
| 6,248,946 B1 * | 6/2001 | Dwek ............... G06F 17/30749 434/307 A |
| 6,255,961 B1 | 7/2001 | Van Ryzin et al. |
| 6,263,313 B1 | 7/2001 | Milsted et al. |
| 6,272,545 B1 | 8/2001 | Flanagin et al. |
| 6,283,764 B2 | 9/2001 | Kajiyama et al. |
| 6,295,541 B1 | 9/2001 | Bodnar |
| 6,332,175 B1 | 12/2001 | Birrell |
| 6,338,044 B1 | 1/2002 | Cook |
| 6,341,316 B1 | 1/2002 | Kloba |
| 6,345,256 B1 | 2/2002 | Milsted |
| 6,356,971 B1 | 3/2002 | Katz |
| 6,380,947 B1 | 4/2002 | Stead |
| 6,389,467 B1 | 5/2002 | Eyal |
| 6,407,750 B1 | 6/2002 | Gioscia |
| 6,411,943 B1 | 6/2002 | Crawford |
| 6,429,880 B2 | 8/2002 | Marcos |
| 6,434,680 B2 | 8/2002 | Belknap et al. |
| 6,446,080 B1 | 9/2002 | Van Ryzin |
| 6,452,609 B1 | 9/2002 | Katinsky |
| 6,453,281 B1 | 9/2002 | Walters |
| 6,490,432 B1 | 12/2002 | Wegener |
| 6,493,758 B1 | 12/2002 | McLain |
| 6,523,124 B1 | 2/2003 | Lunsford |
| 6,529,804 B1 | 3/2003 | Draggon |
| 6,563,769 B1 | 5/2003 | Van Der Meulen |
| 6,587,403 B1 | 7/2003 | Keller |
| 6,587,404 B1 | 7/2003 | Keller |
| 6,621,768 B1 | 9/2003 | Keller |
| 6,636,873 B1 | 10/2003 | Carini |
| 6,664,981 B2 | 12/2003 | Ashe |
| 6,665,803 B2 | 12/2003 | Lunsford |
| 6,694,200 B1 | 2/2004 | Naim |
| 6,718,348 B1 | 4/2004 | Novak |
| 6,721,488 B1 * | 4/2004 | Dimitrova ............ G11B 27/107 348/571 |
| 6,721,489 B1 * | 4/2004 | Benyamin ................ G06F 8/65 386/234 |
| 6,731,312 B2 | 5/2004 | Robbin |
| 6,760,721 B1 | 7/2004 | Chasen |
| 6,763,345 B1 | 7/2004 | Hempleman |
| 6,779,019 B1 | 8/2004 | Mousseau |
| 6,785,542 B1 | 8/2004 | Blight |
| 6,794,566 B2 | 9/2004 | Pachet |
| 6,801,964 B1 | 10/2004 | Mahdavi |
| 6,831,881 B2 | 12/2004 | Patil |
| 6,874,037 B1 | 3/2005 | Abram |
| 6,925,595 B1 | 8/2005 | Whitledge |
| 6,928,433 B2 | 8/2005 | Goodman |
| 6,933,433 B1 | 8/2005 | Porteus |
| 6,941,324 B2 | 9/2005 | Plastina |
| 6,956,562 B1 | 10/2005 | O'Hara |
| 6,959,288 B1 | 10/2005 | Medina |
| 6,978,127 B1 | 12/2005 | Bulthuis |
| 6,987,221 B2 | 1/2006 | Platt |
| 6,993,532 B1 | 1/2006 | Platt |
| 6,999,826 B1 | 2/2006 | Zhou |
| 7,003,495 B1 | 2/2006 | Burger |
| 7,010,758 B2 | 3/2006 | Bate |

(56) References Cited

U.S. PATENT DOCUMENTS

| | | |
|---|---|---|
| 7,022,905 B1 | 4/2006 | Hinman |
| 7,024,214 B2 | 4/2006 | Loveland |
| 7,024,491 B1 | 4/2006 | Hanmann |
| 7,039,656 B1 | 5/2006 | Tsai |
| 7,043,477 B2 | 5/2006 | Mercer |
| 7,055,165 B2 | 5/2006 | Connelly |
| 7,069,058 B2 | 6/2006 | Kawashima |
| 7,075,000 B2 | 7/2006 | Gang |
| 7,111,009 B1 | 9/2006 | Gupta |
| 7,117,516 B2 | 10/2006 | Khoo |
| 7,126,770 B1 | 10/2006 | Arai |
| 7,130,892 B2 | 10/2006 | Mukai |
| 7,136,934 B2 | 11/2006 | Carter |
| 7,146,322 B2 | 12/2006 | Cowgill |
| 7,171,557 B2 | 1/2007 | Kallahalla |
| 7,194,692 B2 | 3/2007 | Marcos |
| 7,209,633 B2 | 4/2007 | Novak |
| 7,228,298 B1 | 6/2007 | Raines |
| 7,272,385 B2 | 9/2007 | Mirouze |
| 7,281,141 B2 | 10/2007 | Elkayam |
| 7,283,880 B2 | 10/2007 | Dick |
| 7,295,983 B2 | 11/2007 | Fujiwara |
| 7,471,988 B2 | 12/2008 | Smith |
| 7,478,323 B2 | 1/2009 | Dowdy |
| 7,502,626 B1 | 3/2009 | Lemilainen |
| 7,560,637 B1 | 7/2009 | Robbin |
| 7,574,574 B2 | 8/2009 | Heller |
| 7,647,346 B2 | 1/2010 | Silverman |
| 7,680,849 B2 | 3/2010 | Heller |
| 7,720,929 B2 | 5/2010 | Morohashi |
| 7,769,903 B2 | 8/2010 | Robbin |
| 7,797,446 B2 | 9/2010 | Heller |
| 8,261,246 B1 | 9/2012 | Naroff |
| 2001/0004310 A1 | 6/2001 | Kono |
| 2001/0011308 A1 | 8/2001 | Clark |
| 2001/0018858 A1 | 9/2001 | Dwek |
| 2001/0021053 A1 | 9/2001 | Colbourne |
| 2001/0041021 A1 | 11/2001 | Boyle |
| 2001/0044835 A1 | 11/2001 | Schober |
| 2001/0048642 A1 | 12/2001 | Berhan |
| 2001/0052123 A1 | 12/2001 | Kawai |
| 2002/0002413 A1 | 1/2002 | Tokue |
| 2002/0010788 A1 | 1/2002 | Nathan |
| 2002/0013784 A1 | 1/2002 | Swanson |
| 2002/0015161 A1 | 2/2002 | Haneda |
| 2002/0016968 A1 | 2/2002 | Nathan |
| 2002/0045960 A1 | 4/2002 | Phillips |
| 2002/0046315 A1 | 4/2002 | Miller |
| 2002/0055934 A1 | 5/2002 | Lipscomb |
| 2002/0073139 A1 | 6/2002 | Hawkins |
| 2002/0073167 A1 | 6/2002 | Powell |
| 2002/0078075 A1 | 6/2002 | Colson |
| 2002/0080180 A1 | 6/2002 | Mander |
| 2002/0089529 A1* | 7/2002 | Robbin ............... G11B 27/105 715/716 |
| 2002/0095663 A1 | 7/2002 | Joory |
| 2002/0113824 A1 | 8/2002 | Myers |
| 2002/0116082 A1 | 8/2002 | Gudorf |
| 2002/0118300 A1 | 8/2002 | Middleton |
| 2002/0118848 A1 | 8/2002 | Karpenstein |
| 2002/0133515 A1 | 9/2002 | Kagle |
| 2002/0138606 A1 | 9/2002 | Robison |
| 2002/0152278 A1 | 10/2002 | Pontenzone |
| 2002/0156921 A1 | 10/2002 | Dutta |
| 2002/0161865 A1 | 10/2002 | Nguyen |
| 2002/0174243 A1 | 11/2002 | Spurgat |
| 2002/0174269 A1 | 11/2002 | Spurgat |
| 2002/0194195 A1 | 12/2002 | Fenton |
| 2002/0194309 A1 | 12/2002 | Carter |
| 2003/0013493 A1 | 1/2003 | Irimajiri |
| 2003/0014767 A1 | 1/2003 | Stumphauzer |
| 2003/0030733 A1 | 2/2003 | Seaman |
| 2003/0037254 A1 | 2/2003 | Fischer |
| 2003/0046434 A1 | 3/2003 | Flanagin |
| 2003/0050058 A1 | 3/2003 | Walsh |
| 2003/0055723 A1 | 3/2003 | English |
| 2003/0065802 A1 | 4/2003 | Vitikainen |
| 2003/0074457 A1 | 4/2003 | Kluth |
| 2003/0076301 A1 | 4/2003 | Tsuk |
| 2003/0079038 A1 | 4/2003 | Robbin |
| 2003/0081784 A1 | 5/2003 | Kallahalla |
| 2003/0093340 A1 | 5/2003 | Krystek |
| 2003/0097379 A1 | 5/2003 | Ireton |
| 2003/0098893 A1 | 5/2003 | Makinen |
| 2003/0112279 A1 | 6/2003 | Irimajiri |
| 2003/0144918 A1 | 7/2003 | Novelli |
| 2003/0149628 A1 | 8/2003 | Abbosh |
| 2003/0158737 A1 | 8/2003 | Csicsatka |
| 2003/0167318 A1 | 9/2003 | Robbin |
| 2003/0182315 A1 | 9/2003 | Plastina |
| 2003/0191756 A1 | 10/2003 | Oh |
| 2003/0197725 A1 | 10/2003 | Tuli |
| 2003/0206203 A1 | 11/2003 | Ly |
| 2003/0210821 A1 | 11/2003 | Yogeshwar |
| 2003/0221541 A1 | 12/2003 | Platt |
| 2004/0001395 A1 | 1/2004 | Keller |
| 2004/0001396 A1 | 1/2004 | Keller |
| 2004/0003151 A1 | 1/2004 | Bateman |
| 2004/0004338 A1 | 1/2004 | Jung |
| 2004/0017997 A1 | 1/2004 | Cowgill |
| 2004/0027930 A1 | 2/2004 | Kudo |
| 2004/0055446 A1 | 3/2004 | Robbin |
| 2004/0068536 A1 | 4/2004 | Demers |
| 2004/0076086 A1 | 4/2004 | Keller |
| 2004/0078416 A1 | 4/2004 | Kawasaki |
| 2004/0083480 A1 | 4/2004 | Dodge |
| 2004/0093274 A1 | 5/2004 | Vanska |
| 2004/0103102 A1 | 5/2004 | Nelson |
| 2004/0113915 A1 | 6/2004 | Ohtsuki |
| 2004/0123242 A1 | 6/2004 | McKibben |
| 2004/0123725 A1 | 7/2004 | Kim |
| 2004/0128198 A1 | 7/2004 | Register |
| 2004/0128277 A1 | 7/2004 | Mander |
| 2004/0139180 A1 | 7/2004 | White |
| 2004/0139844 A1 | 7/2004 | Tsuboi |
| 2004/0148358 A1 | 7/2004 | Singh |
| 2004/0168118 A1* | 8/2004 | Wong ............... G06F 16/40 715/202 |
| 2004/0193900 A1 | 9/2004 | Nair |
| 2004/0205028 A1 | 10/2004 | Verosub |
| 2004/0215534 A1 | 10/2004 | Gautier |
| 2004/0216108 A1 | 10/2004 | Robbin |
| 2004/0223245 A1 | 11/2004 | Morohashi |
| 2004/0225762 A1 | 11/2004 | Poo |
| 2004/0236568 A1 | 11/2004 | Guillen |
| 2004/0242224 A1 | 12/2004 | Janik |
| 2004/0252604 A1 | 12/2004 | Johnson |
| 2004/0261064 A1 | 12/2004 | Goldstein |
| 2004/0267825 A1 | 12/2004 | Novak |
| 2005/0010616 A1 | 1/2005 | Burks |
| 2005/0055444 A1 | 3/2005 | Venkatasubramanian |
| 2005/0055718 A1 | 3/2005 | Stone |
| 2005/0060264 A1 | 3/2005 | Schrock |
| 2005/0080915 A1 | 4/2005 | Shoemaker |
| 2005/0102329 A1 | 5/2005 | Jiang |
| 2005/0147130 A1 | 7/2005 | Hurwitz |
| 2005/0149392 A1 | 7/2005 | Gold |
| 2005/0235015 A1 | 10/2005 | Abanami |
| 2005/0240494 A1 | 10/2005 | Cue |
| 2005/0240661 A1 | 10/2005 | Heller |
| 2005/0249080 A1 | 11/2005 | Foote |
| 2005/0262528 A1 | 11/2005 | Herley |
| 2005/0267803 A1 | 12/2005 | Patel |
| 2005/0278377 A1 | 12/2005 | Mirrashidi |
| 2005/0281185 A1 | 12/2005 | Kawasaki |
| 2006/0027080 A1 | 2/2006 | Schultz |
| 2006/0036567 A1 | 2/2006 | Tan |
| 2006/0090202 A1 | 4/2006 | Liu |
| 2006/0100978 A1 | 5/2006 | Heller |
| 2006/0106806 A1 | 5/2006 | Sperling |
| 2006/0123010 A1 | 6/2006 | Landry |
| 2006/0136292 A1 | 6/2006 | Bhati |
| 2006/0143455 A1 | 6/2006 | Gitzinger |
| 2006/0156236 A1 | 7/2006 | Heller |

(56) References Cited

U.S. PATENT DOCUMENTS

| | | |
|---|---|---|
| 2006/0159109 A1 | 7/2006 | Lamkin |
| 2006/0163358 A1* | 7/2006 | Biderman .......... H04L 67/1095 |
| | | 235/472.01 |
| 2006/0168340 A1 | 7/2006 | Heller |
| 2006/0168351 A1 | 7/2006 | Ng |
| 2006/0173974 A1 | 8/2006 | Tang |
| 2006/0200599 A1 | 9/2006 | Manchester |
| 2006/0212442 A1 | 9/2006 | Conrad |
| 2006/0224620 A1 | 10/2006 | Silverman |
| 2006/0230081 A1 | 10/2006 | Craswell |
| 2006/0247980 A1 | 11/2006 | Mirrashidi |
| 2006/0265329 A1 | 11/2006 | Hug |
| 2006/0288057 A1 | 12/2006 | Collins |
| 2007/0013051 A1 | 1/2007 | Heyan |
| 2007/0033052 A1 | 2/2007 | Cowgill |
| 2007/0038941 A1 | 2/2007 | Wysocki |
| 2007/0067309 A1 | 3/2007 | Klein, Jr. |
| 2007/0073723 A1 | 3/2007 | Ramer |
| 2007/0073728 A1 | 3/2007 | Klein, Jr. |
| 2007/0074118 A1 | 3/2007 | Robbin |
| 2007/0084333 A1 | 4/2007 | Robbin |
| 2007/0088727 A1 | 4/2007 | Kindig |
| 2007/0088764 A1 | 4/2007 | Yoon |
| 2007/0124680 A1 | 5/2007 | Robbin |
| 2007/0130541 A1 | 6/2007 | Louch |
| 2007/0185919 A1 | 8/2007 | Kaplan |
| 2007/0203954 A1 | 8/2007 | Vargas |
| 2007/0220552 A1 | 9/2007 | Juster |
| 2007/0226384 A1 | 9/2007 | Robbin |
| 2007/0271312 A1 | 11/2007 | Heller |
| 2007/0291323 A1 | 12/2007 | Roncal |
| 2008/0018927 A1 | 1/2008 | Martin |
| 2008/0028008 A1 | 1/2008 | Brunet |
| 2008/0086494 A1 | 4/2008 | Heller |
| 2008/0168185 A1 | 7/2008 | Robbin |
| 2008/0168245 A1 | 7/2008 | De Atley |
| 2008/0168391 A1 | 7/2008 | Robbin |
| 2008/0168525 A1 | 7/2008 | Heller |
| 2008/0168526 A1 | 7/2008 | Robbin |
| 2008/0256378 A1 | 10/2008 | Guillorit |
| 2009/0063496 A1 | 3/2009 | Cunningham |
| 2009/0063543 A1 | 3/2009 | Martin |
| 2009/0138936 A1 | 5/2009 | Biderman |
| 2009/0290725 A1 | 11/2009 | Huang |
| 2016/0149995 A1 | 5/2016 | Heller |

FOREIGN PATENT DOCUMENTS

| | | |
|---|---|---|
| EP | 1028425 A1 | 8/2000 |
| EP | 1353269 A2 | 10/2003 |
| EP | 1408427 A2 | 4/2004 |
| EP | 1429569 A1 | 6/2004 |
| EP | 1548740 A2 | 6/2005 |
| JP | 2000339917 A | 12/2000 |
| JP | 2001076465 A | 3/2001 |
| JP | 2001093226 A | 4/2001 |
| JP | 2001117800 A | 4/2001 |
| JP | 2001291365 A | 10/2001 |
| JP | 2002074909 A | 3/2002 |
| JP | 2003077214 A | 3/2003 |
| JP | 2003303137 A | 10/2003 |
| JP | 2003319485 A | 11/2003 |
| KR | 20010063284 A | 7/2001 |
| KR | 20010079176 A | 8/2001 |
| KR | 20020011027 A | 2/2002 |
| KR | 20060035634 A | 4/2006 |
| KR | 100599204 B1 | 7/2006 |
| WO | 9408337 A1 | 4/1994 |
| WO | 9516950 A1 | 6/1995 |
| WO | 0043914 A1 | 7/2000 |
| WO | 0133569 A1 | 5/2001 |
| WO | 2001053963 A1 | 7/2001 |
| WO | 0167753 A1 | 9/2001 |
| WO | 0225610 A1 | 3/2002 |
| WO | 0225935 A2 | 3/2002 |
| WO | 03023786 A2 | 1/2003 |
| WO | 03036541 A1 | 5/2003 |
| WO | 2004004338 A1 | 1/2004 |
| WO | 2004084413 A2 | 1/2004 |
| WO | 2004034286 A1 | 4/2004 |
| WO | 2004057474 A1 | 7/2004 |
| WO | 2005060387 A2 | 7/2005 |
| WO | 2005073856 A2 | 8/2005 |
| WO | 2005114472 A1 | 12/2005 |
| WO | 2006018030 A1 | 2/2006 |
| WO | 2006047578 A2 | 5/2006 |

OTHER PUBLICATIONS

Apple Introduces iTunes-World's Best and Easiest to Use Jukebox Software,' Macworld Expo, San Francisco, Jan. 9, 2001.

Digital Still Cameras—Downloading Images to a Computer,' Mimi Chakarova et al., Multi-Media Reporting and Convergence, 2 pgs.

Nomad Jukebox,' User Guide, Creative Technology Ltd., Version 1, Aug. 2000.

SoundJam MP Plus Manual, version 2.0'-MP3 Player and Encoder for Macintosh by Jeffrey Robbin, Bill Kincaid and Dave Heller, manual by Tom Negrino, published by Casady & Greene, Inc., 2000.

"About MusicMatch Jukebox," MusicMatch Jukebox v4 Help, pp. 1-4 (1999).

"Broadcast Tools: SpotBase, Playlist & TapeBase," ASC Audio Video Corporation, pp. 1-2, Mar. 1998.

"CartWorks File Utilities User's Manual," dbm Systems, Inc., pp. 1-8, Jul. 1998.

"CartWorks MHD Music-on-Hard-Drive QuickSchedule User's Manual," dbm Systems, Inc., pp. 1-8, Feb. 8, 1998.

"CartWorks On-Demand Editor User's Manual," dbm Systems, Inc., pp. 1-7, Feb. 1998.

"CartWorks Script Editor User's Manual v3.12," dbm Systems, Inc., pp. 1-26, Feb. 1998.

"CartWorks Spot Set Editor User's Manual," dbm Systems, Inc., pp. 1-11, Feb. 1998.

"Diamond Multimedia Announces Rio PMP300 Portable MP3 Music Player," Press Release, http://news.harmony-central.com/Newp/1998/Rio-PMP300.html, Sep. 14, 1998, 4 pgs.

"Digital Audio Just Got Easier!," CartWorks Digital Audio Systems, dbm Systems, Inc., Jun. 26, 1996.

"Gravis WinDecks Version 1.12," screen shots, Gravis Computer Technology Ltd., pp. 1-10, Jan. 1990.

"Hewlett Packard Jornada 525 Color Pocket PC," downloaded Jan. 25, 2002, http://www.pc4d.com/electronics/products/56/jornada_525_color_pocket_pc.shtml.

"iPod + iTunes," Markt+Technick Verlang, Dec. 22, 2007.

"iTunes Celebrates Its First Anniversary; Over 70 Million Songs Purchase," Apr. 28, 2004, http://www.apple.com/pr/library/2004/apr/28itunes.html.

"Perfect guide for digital/audio technique to enjoy music in PC," Nobuya Fukuda, published in "Nikkei Click," Japan, Nikkei business Publications, Inc., Sep. 8, 1999, vol. 6/No. 10, p. 169.

"Pocket PC Phone User Manual," High Tech Computer Corp., 2006.

"Rio Portable Music Player," Web Review, downloaded Jan. 25, 2002, http://www.webreviews.com/9901/rio.html.

"The DADpro Digital Audio Delivery System Operation Manual Version 1.0," IBM Corp., pp. 1-424, Aug. 30, 1996.

"Virtual Recorder—Basic Operations," ASC Audio Video Corporation, pp. 1-94, Sep. 9, 1996.

"VR300 Advanced Broadcast Video Server," ASC Audio Video Corporation, pp. 1-9, Mar. 1998.

"VR300 Video Server User Manual, Version 1.0," ASC Audio Video Corporation, pp. 1-40, Mar. 20, 1998.

"WinDecks, User Instructions," Gravis Computer Technology Ltd., pp. 1-14, Jan. 1990.

Adam C. Engst, 'SoundJam Keeps on Jammin',' Jun. 19, 2000, http://db.tidbits.com/getbits.acgi?tbart=05988.

Alicia Awbrey, press release entitled "Apple's iPod Available in Stores Tomorrow," Nov. 9, 2001.

(56) References Cited

OTHER PUBLICATIONS

Andrew Birrell, 'Personal Jukebox (PJB),' Oct. 13, 2000, http://birrell.org/andrew/talks/pjb-overview.ppt.
Andy Lindauer, "What's in your Pocket?," Edgereview, downloaded Jan. 25, 2002, http://www.edgreview.com/print.cfm?Type=aag&ID=286.
Apple Inc., "Apple-Downloads-Dashboard," http://www.apple.com/downloads/dashboard, downloaded Dec. 16, 2008, pp. 1-2.
Birrell, et al., "Can You Carry Your CD Collection in Your Pocket?," Personal Jukebox, Compaq Computer Corp., downloaded Oct. 13, 2000, http://research.compaq.com/SRC/pjb.
Bott, "Special Edition Using Microsoft 1-18 Windows Millennium Passage," Special Edition Using Microsoft Windows Millennium Edition, Nov. 3, 2000, pp. 1-24.
Breen, Christopher, "iMixing it up: Sharing Your Sounds," Sep. 17, 2004, http://playlistmag.com/help/2004/09/mixhowto/index.php.
Bridgman, "Windows XP Expert Zone Community Columnist," Using Windows Mobile-based Portable Media Centers and Windows Media Player 10, Aug. 25, 2004, 1-11.
Compaq Computer Corp., copyright 1991, Personal Jukebox User Manual, pp. 1-29.
Compaq, "Personal Jukebox," Jan. 24, 2001, http://research.compaq.com/SRC/pjb/.
De Herrera, Chris, "Microsoft ActiveSync 3.1," Version 1.02, Oct. 13, 2000.
Erdmann et al., "iPod + iTunes," O'Reilly, 2006.
Etchison, "Accelerated Discrete Adjustment of the Parameters of a Process," IBM Technical Disclosure Bulletin, vol. 15, No. 5, Oct. 1, 1972, 2 pgs.
Firewire, IEEE 1394 (also known as Sony's iLink), http://www.wikipedia.org/wiki/Firewire (1995).
Glenn Fleishman, "Handheld iPod joins MP3 band a bit late, but is standout player," Nov. 6, 2001, http://seattletimes.nwsource.com/html/businesstechnology/134361811_ptmacc040.html.
Half-life—Wikipedia, the free encyclopedia, http://enwikipedia.org/wiki/Half-life.
Handbook for Palm m500 Series Handhelds, User Manual.
Hei et al., "iPod+iTunes," Markt+Technick Verlang, Dec. 22, 2006.
International Search Report and Written Opinion for PCT/US2007/078043, dated Aug. 18, 2008.
International Search Report dated Jul. 9, 2003, from International Application No. PCT/US2003/021534.
Iriver, "PMP140/120," Sep. 13, 2004, 1-2 pgs.
iTunes 2, Playlist Related Help Screens, iTunes v2.0, Apple Computer, Inc., Oct. 23, 2001.
iTunes-Perl, copyright 2004-2006 by Jay McGavren, obtained from the Internet at http://code.google.com, pp. 7.
iTunes, Digital Music for your Mac, Apple Computer, Inc., downloaded Oct. 22, 2001, http://www.apple.com/itunes.
iTunes, Playlist Related Help Screens, iTunes v1.0, Apple Computer, Inc., Jan. 2001.
Kawamoto et al., "On 1st Birthday, iTunes Unwraps New Features," Apr. 28, 2004, http://news.com.com/On+1st+birthday,+iTunes+unwraps+new+features/2100-1027_3-5201598.html.
Lowery, Daryl, "Random-Access Digital Audio-Recording Systems," pp. 68-71, Jun. 1992.
Lyra, Personal Digital Player, RCA, Product Box (2003).
M. Nilsson, ID3 tag version 2.3.0, Feb. 3, 1999, http://www.id3lib.org/id3v2.3.0.html.
M. Nilsson, ID3 tag version 2.4.0—Main Structure, Nov. 1, 2000, http://www.id3.org/id3v2.4.0-structure.
Mabini, MemMaid Review, Pocket PC Dubai, Jul. 23, 2004 [online], [retrieved on Mar. 26, 2008], Retrieved from the Internet <URL: http://www.pocketpcdubai.com/DinarSoft/memmaid_review.html>.
MG-25, Portable MPEG4 Player (MG-25), Jul. 29, 2004, 1-3 pgs.
Miniman, "Applian Software's Replay Radio and Player v1.02," Product review, pocketnow.com, http://www.pocketnow.com/reviews/replay/replay.htm, Jul. 31, 2001.
Musicmatch, "Musicmatch and Xing Technology Introduce Musicmatch Jukebox," May 18, 1998, http://www.musicmatch.com/info/company/press/releases/?year=1998&release=-2.
Nielsen et al., "Comparative Design Review: An Exercise in Parallel Design," Interchi '93, pp. 414-417, Apr. 24-29, 1993.
Nutzel et al., "Sharing Systems for Future HiFi Systems," Proceedings of the Fourth International Conference on Web Delivering of Music, Sep. 13, 2004, 8 pgs.
PBS Local Insertion Server Instruction Manual, Microvision, Inc., pp. 1-71, Jun. 19, 1996.
Personal Jukebox (PJB), "Systems Research Center and PAAD," Compaq Computer Corp., Oct. 13, 2000, http://research.compaq.com/SRC/pjb/.
Pocket Tunes 5.0.0, copyright 2002-2009 Normsoft, Inc., pp. 1-25, obtained from the Internat at: http://www.pocket-tunes.com.
RCA Lyra User's Guide, RD2201/2202/2204, www.lyrazone.com, pp. 1-37 (1999).
RCS Works—Cart Wall User's Guide and Reference Manual, pp. 1-83, Feb. 7, 1993.
RealJukebox Plus Manual, Real Networks, Inc., copyright 1999, pp. 1-83, RealJukebox, Real Networks, Inc., webpages downloaded Oct. 27, 2005 http://www.real.com/Jukebox/release_notes.html#.
Replay Gain, "Replay Gain—A proposed Standard," Oct. 7, 2001, available from http://replaygain.hydrogenaudio.org/index.html and http://replaygain.hydrogenaudio.org/outline.html.
Sadie Master System, Product Brochure, Studio audio Digital Equipment Inc., 2 pgs. Jan. 1995.
Sinitsyn, Alexander. "A Synchronization Framework for Personal Mobile Servers," Pervasive Computing and Communications Workshops, 2004. Proceedings of the Second IEEE Annual Conference on, Piscataway, NJ, USA, IEEE, Mar. 14, 2004, pp. 208-212.
Skarlatos et al., "Sprite Software Sprite Backup 5.0," Internet Publication, www.pocketnow.com/index.php?a+portal_print&t=review&id=788, Mar. 6, 2005.
SoundJam MP Plus, Representative Screens, published by Casady & Greene, Inc., Salinas, CA, 2000.
Specification Sheet, iTunes 2, Apple Computer, Inc., Oct. 31, 2001.
Steinberg, 'Sonicblue Rio Car,' Product Review, Dec. 12, 2000, http://electronics.cnet.com/electronics/0-6342420-1304-4098389.html.
Top Stories of Dec. 18, 2001: Apple posts Automated Scripts for iTunes 2.03, pp. 11, obtained from the internet at: http://www.xlr8yourmac.com.
Torrone, Phillip, "How-To: Getting Podcasts on a Portable Media Center (and other Windows Media Devices)," Oct. 12, 2004 [online], [retrieved on Jun. 5, 2009], Retrieved from Engadget <URL: http://www.engadget.com/2004/10/12/hot-to-getting-podcasts-on-a-portable-media-center-and-other/>.
Travis Butler, "Archos Jukebox 6000 Challenges Nomad Jukebox," Aug. 13, 2001, http://db.tidbits.com/getbits.acgi?tbart-06521.
Travis Butler, "Portable MP3: The Nomad Jukebox," Jan. 8, 2001, http://db.tidbits.com/getbits.acgi?tbart=06261.
TuneBase 100 User Guide, A CD Library Management System, Escient, Inc., copyright 1999.
TuneBase Pro Mk-II User's Guide, Escient, Inc., 1999.
Vetro et al., "Media Conversions to Support Mobile Users," IEEE Canadian Conference on Electrical and Computer Engineering, Piscataway, NJ, May 13, 2001, pp. 607-612.
Wave Station Digital Audio Automation System, Instruction & Operations Manual Broadcast Software International, pp. 1-113, Feb. 4, 1997.
Wikipedia: "iTunes," www.wikipedia.com, May 9, 2005, 6 pages.
Window's Media Player 6.4, Microsoft Corp., copyright 1999, software available at http://www.oldversion.com/program.php?n=wmp See also Windows Media Player 6.4 Software Official Website at http://www.microsoft.com/windows/windowsmedia/player/version64/default.aspx.
Windows XP Service Pack 2, Figures 1-2 and "How to obtain the latest Windows XP service pack," Aug. 25, 2004.
Zheng et al., "MobiGATE: a mobile gateway proxy for the active deployment of transport entities," Proceedings of the 2004 Interna-

(56) References Cited

OTHER PUBLICATIONS tional Conference on Parallel Processing, Piscataway, NJ, Aug. 15, 2004.

* cited by examiner

PERSISTENT GROUP OF MEDIA ITEMS FOR A MEDIA DEVICE

CROSS-REFERENCE TO RELATED APPLICATIONS

This application is a Continuation of U.S. application Ser. No. 11/097,034, filed Apr. 1, 2005, and entitled "PERSISTENT GROUP OF MEDIA ITEMS FOR A MEDIA DEVICE," which in turn claims priority to U.S. Provisional Application No. 60/642,334, filed Jan. 7, 2005, and entitled "MEDIA MANAGEMENT FOR GROUPS OF MEDIA ITEMS," which is hereby incorporated herein by reference.

This application is related to: (i) U.S. application Ser. No. 11/097,591, filed Apr. 1, 2005, and entitled "MEDIA MANAGEMENT FOR GROUPS OF MEDIA ITEMS," which is hereby incorporated herein by reference; (ii) U.S. application Ser. No. 10/973,925, filed Oct. 25, 2004, and entitled "MULTIPLE MEDIA TYPE SYNCHRONIZATION BETWEEN HOST COMPUTER AND MEDIA DEVICE," which is hereby incorporated herein by reference; (iii) U.S. patent application Ser. No. 10/833,879, filed Apr. 27, 2004, and entitled "METHOD AND SYSTEM FOR SHARING PLAYLISTS," which is hereby incorporated by reference herein; (iv) U.S. patent application Ser. No. 10/833,399, filed Apr. 27, 2004, and entitled "METHOD AND SYSTEM FOR CONFIGURABLE AUTOMATIC MEDIA SELECTION," which is hereby incorporated by reference herein; (v) U.S. patent application Ser. No. 10/277,418, filed Oct. 21, 2002, and entitled "INTELLIGENT INTERACTION BETWEEN MEDIA PLAYER AND HOST COMPUTER," which is hereby incorporate herein by reference; (vi) U.S. patent application Ser. No. 10/198,639, filed July 2002, and entitled "METHOD AND SYSTEM FOR UPDATING PLAYLISTS," which is hereby incorporated by reference herein; and (vii) U.S. patent application Ser. No. 10/188,069, filed Apr. 5, 2002, and entitled "INTELLIGENT SYNCHRONIZATION OF MEDIA PLAYER WITH HOST COMPUTER," which is hereby incorporated herein by reference.

BACKGROUND OF THE INVENTION

Field of the Invention

The present invention relates to media devices and, more particularly, to management of media on media devices.

Description of the Related Art

A media player stores media assets, such as audio tracks or photos, that can be played or displayed on the media player. One example of a media player is the iPod® media player, which is available from Apple Computer, Inc. of Cupertino, Calif. Often, a media player acquires its media assets from a host computer that serves to enable a user to manage media assets. As an example, the host computer can execute a media management application to manage media assets. One example of a media management application is iTunes®, version 4.2, produced by Apple Computer, Inc.

Media assets can be moved between the host computer and the media player through use of a manual drag and drop operation, or through an automatic synchronization once a bus connection over a peripheral cable connects the media player to the host computer. Additional details on automatic synchronization are provided in U.S. Patent Publication No.: 2003/0167318 A1, which is hereby incorporated herein by reference.

In managing media assets, a user can create playlists for audio tracks. These playlists can be created at the host computer. Media assets within the playlists can then be copied to the media player. Often, the amount of media assets at the host computer exceeds the storage capacity of the media player. In such case, the user of the host computer can select a subset of the media assets at the host computer to be copied to the media player. For example, a user might select certain playlists to be copied to the media player when synchronized.

Conventionally, a media player is considered a media source for a media management application so long as the media player is connected to the host computer. That is, once the media management application detects the media player, a visual representation of the media player can be displayed. However, once the media player is disconnected, the visual representation of the media player is removed. Hence, media assets, namely, playlists of media assets, on the media player can be managed at the host computer only while the media player is connected to its host computer. In particular, if the media player is not connected to the host computer, then the media player is not a media source and, therefore, its media assets cannot be managed at the host computer. This can be a disadvantage for users that want to manage the media assets provided on the media player from the host computer.

Thus, there is a need for improved techniques to facilitate management and usage of media assets for media devices.

SUMMARY OF THE INVENTION

Broadly speaking, the invention pertains to improved techniques to utilize and manage a group of media items (or media assets) on a computing device. The group of media items can be utilized and managed at a host computer for the host computer as well as a media device (e.g., media player) that can couple to the host computer. One popular example of a group of media items is known as a playlist, which can pertain to a group of audio tracks.

One aspect of the invention pertains to providing a persistent media device playlist at a host computer. The persistent media device playlist represents a playlist dedicated to a media device that can couple to the host computer. Another aspect of the invention pertains to imposing capacity limits to a playlist, such as a media device playlist. Still another aspect of the invention pertains to a graphical user interface that enables a user to trade-off storage capacity of a media device between media asset storage and non-media asset storage. Yet still another aspect of the invention pertains to a graphical user interface that assists a user with selecting media items to fill a group of media items.

The invention can be implemented in numerous ways, including as a method, system, device, apparatus (including graphical user interface), or computer readable medium. Several embodiments of the invention are discussed below.

As a method of managing a media device playlist for use on a host computer and a media device, one embodiment of the invention includes at least the acts of: displaying a media device playlist indicator for the media device playlist on a display screen of the host computer; displaying a list of audio tracks that are within the media device playlist on the display screen when the media device playlist indicator is selected, the audio tracks being stored locally on the host computer; determining whether the media device is connected to the host computer; permitting a user of the host computer to add or remove audio tracks to or from the media device playlist, regardless of whether the media device is connected to the host computer; and updating audio tracks stored on the media device once the user has added or removed audio tracks to or from the media device playlist, provided that the media device is connected to the host computer.

As a method of managing a media device playlist for use on a host computer and a media device, another embodiment of the invention includes at least the acts of: displaying a media device playlist indicator for the media device playlist on a display screen of the host computer; displaying a representation of audio tracks that are within the media device playlist on the display screen, all of the audio tracks being stored locally on the host computer and at least a portion of the audio tracks being stored on the media device; and managing the audio tracks within the media device playlist by adding or removing audio tracks to or from the media device playlist.

As a computer readable medium including at least computer program code for managing a media device media grouping for use on a host computer and a media device, one embodiment of the invention includes at least: computer program code for displaying a media device media grouping indicator for the media device media grouping on a display screen of the host computer; computer program code for displaying a list of media items that are within the media device media grouping on the display screen when the media device media grouping indicator is selected, the media items being stored locally on the host computer; computer program code for determining whether the media device is connected to the host computer; computer program code for permitting a user of the host computer to add or remove media items to or from the media device media grouping, regardless of whether the media device is connected to the host computer; and computer program code for updating media items stored on the media device once the user has added or removed media items to or from the media device media grouping, provided that the media device is connected to the host computer.

As a computer readable medium including at least computer program code for managing a media item grouping for use on a host computer and a media device, another embodiment of the invention includes at least: computer program code for displaying a media item grouping indicator for the media item grouping on a display screen of the host computer; computer program code for displaying a representation of media items that are within the media item grouping on the display screen, all of the media items being stored locally on the host computer and at least a portion of the media items being stored on the media device; and computer program code for managing the media items within the media item grouping by adding or removing media items to or from the media item grouping, wherein the media item grouping is dedicated to the media device.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved techniques to utilize and manage a group of media items (or media assets) on a computing device. The group of media items can be utilized and managed at a host computer for the host computer as well as a media device (e.g., media player) that can couple to the host computer. One popular example of a group of media items is known as a playlist, which can pertain to a group of audio tracks.

One aspect of the invention pertains to providing a persistent media device playlist at a host computer. The persistent media device playlist represents a playlist dedicated to a media device that can couple to the host computer. Another aspect of the invention pertains to imposing capacity limits to a playlist, such as a media device playlist. Still another aspect of the invention pertains to a graphical user interface that enables a user to trade-off storage capacity of a media device between media asset storage and non-media asset storage. Yet still another aspect of the invention pertains to a graphical user interface that assists a user with selecting media items to fill a group of media items.

Embodiments of the invention are discussed below with reference to FIGS. 1-10. However, those skilled in the art will readily appreciate that the detailed description given herein with respect to these figures is for explanatory purposes as the invention extends beyond these limited embodiments.

Figure 1:
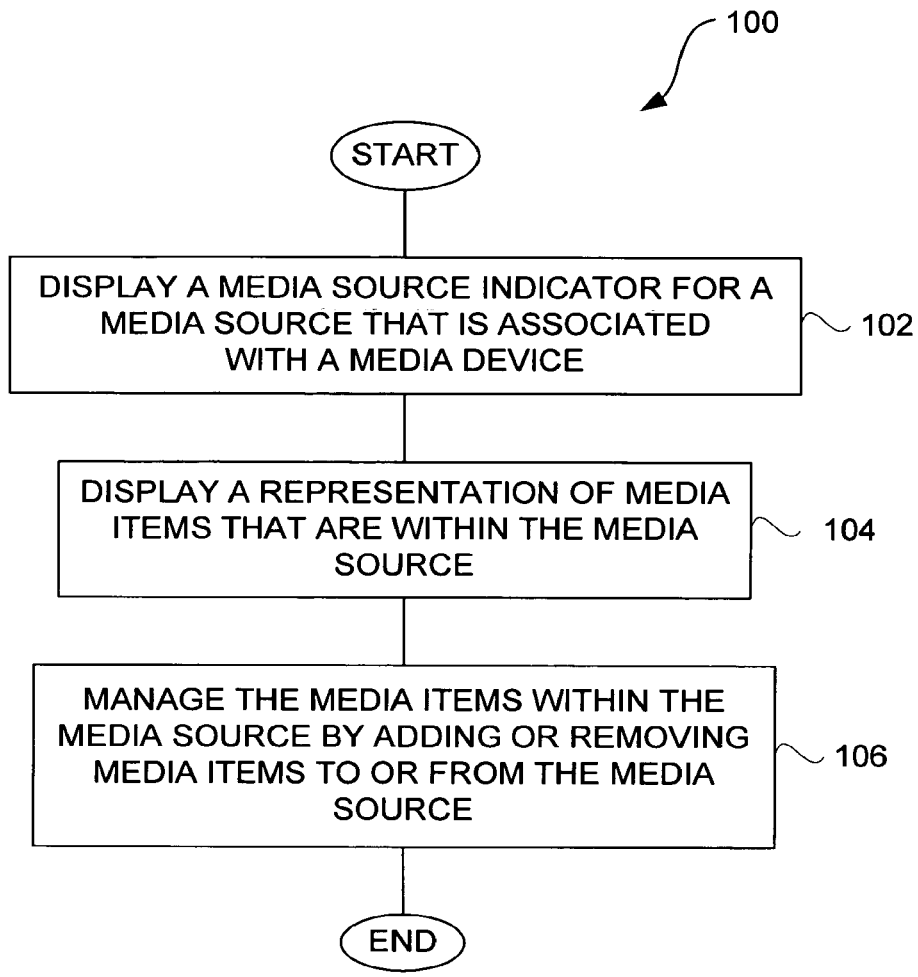
FIG. 1 is a flow diagram of a host-based media source management process according to one embodiment of the invention.

FIG. 1 is a flow diagram of a host-based media source management process 100 according to one embodiment of the invention. Typically, the host-based media source management process 100 is performed by a host computer for the benefit of not only the host computer but also a media device. Often, the host-based media source management process 100 operates following a request by a user of the host computer.

The host-based media source management process 100 initially displays 102 a media source indicator for a media source that is associated with a media device. Then, a representation of media items that are within the media source are displayed 104. The media items within the media source can then be managed 106 by adding or removing media items to or from the media source. Following the block 106, the host-based media source management process 100 is complete and ends.

In one embodiment, the media source pertains to a media device playlist. A media device playlist is a playlist that is dedicated to a particular media device. That is, the media items present on the media device should closely correspond to the media items in the media device playlist. Typically, a host computer can manage the media device playlist for both the host computer and the media device. The media items can pertain to one or more different types of media content. In one embodiment, the media items are audio tracks. In another embodiment, the media items are images (e.g., photos). However, in other embodiments, the media items can be any combination of audio, graphical or video content.

A playlist identifies particular media items that are to be played in a sequence. In general, a playlist can be considered an ordered list of media items. Internally, according to one embodiment, the playlist can be represented in a media database as a data structure that points to files of the appropriate media items residing on the storage device within the media device. Hence, for a given playlist, the pointers to the files of the appropriate media items on the media device will differ from the pointers to the files for the same media items on the host computer, thus the need to update the pointers if a particular playlist is moved between the host computer and the media device.

Figure 2:
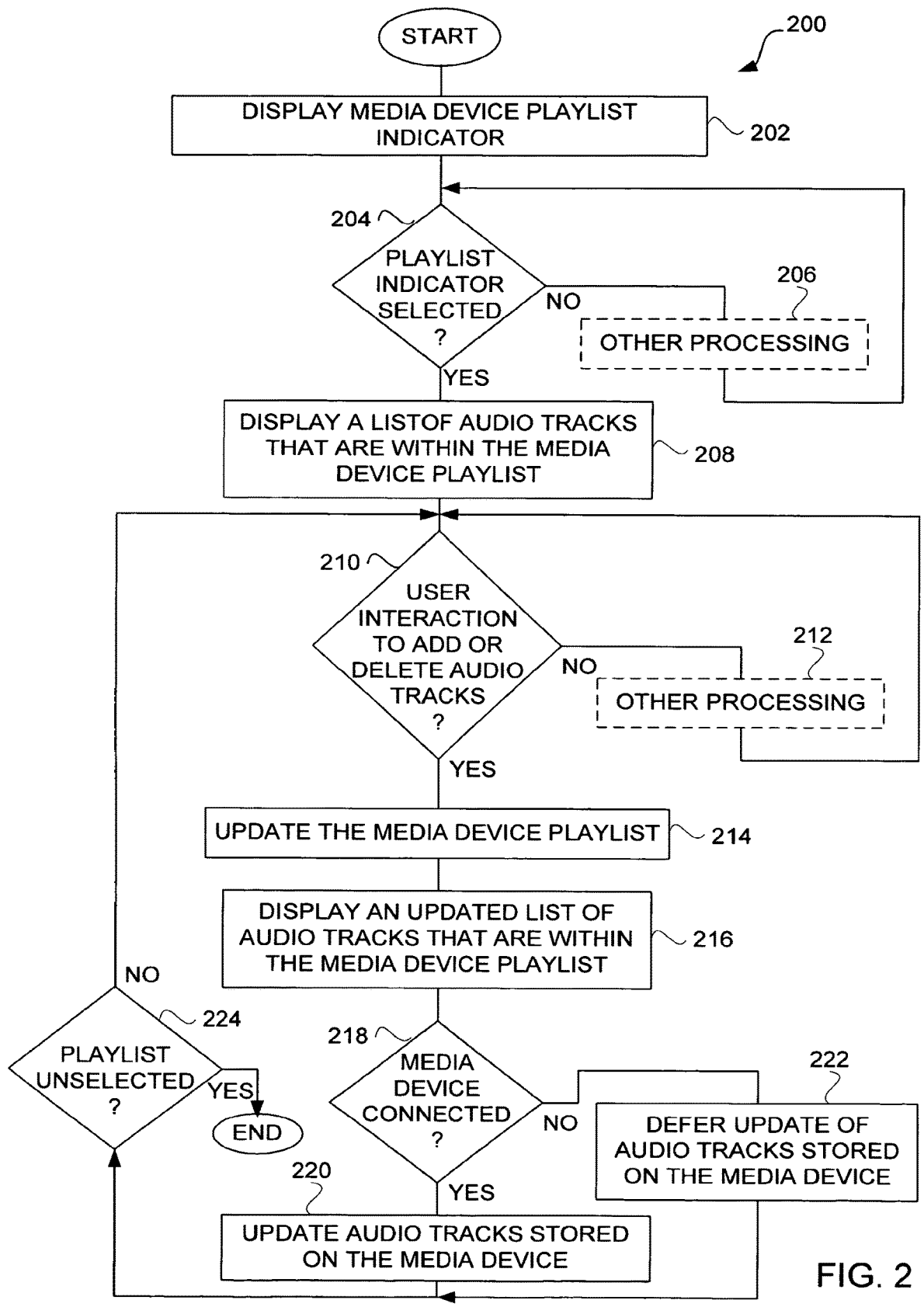
FIG. 2 is a flow diagram of a playlist management process according to one embodiment of the invention.

FIG. 2 is a flow diagram of a playlist management process 200 according to one embodiment of the invention. The playlist management process 200 is, for example, performed by a host computer, such as a host computer performing a media management application. The playlist management process 200 serves to manage media not only on the host computer but also on a portable media device that can connect to the host computer.

The playlist management process 200 initially displays 202 a media device playlist indicator. A decision 204 then determines whether the playlist indicator has been selected. Here, a user of the host computer can cause the playlist indicator to be selected. When the decision 204 determines that the playlist indicator has not yet been selected, then other processing 206 can optionally be performed. Following the other processing 206, if any, the playlist management process 200 returns to repeat the decision 204 and subsequent blocks.

On the other hand, when the decision 204 determines that the playlist indicator has been selected, then a list of audio tracks that are within the media device playlist are displayed 208. After the list of audio tracks is displayed 208, the user of the host computer can interact with the list of audio tracks to either add or delete audio tracks from the media device playlist. In this regard, a decision 210 determines whether user interaction has requested to add or delete audio tracks to or from the media device playlist. When the decision 210 determines that no such user interaction has been requested, other processing 212 can optionally be performed. Following the other processing 212, if any, the playlist management process 200 returns to repeat the decision 210 and subsequent blocks. Once the decision 210 determines that user interaction has requested to add or delete audio tracks with respect to the media device playlist, then the media device playlist is updated 214. Then, the updated list of audio tracks that are within the media device playlist are displayed 216.

Next, a decision 218 then determines whether an associated media device is connected to the host computer. When the decision 218 determines that the media device is connected to the host computer, then audio tracks to be stored on the media device are updated 220. In other words, the additions and/or deletions of audio tracks can be performed to affect update of the audio tracks stored at the media device. On the other hand, when the decision 218 determines that the associated media device is not connected to the host computer, update of audio tracks to be stored on the media device is deferred 222. In other words, if the associated media device is "off-line" with respect to the host computer, the update to the audio tracks stored on the media device is deferred until a later point in time when the media device is "on-line" with respect to the host computer. For example, the update of the audio tracks stored on the media device can be deferred 222 until the media device is next connected to the host computer. Following the blocks 220 and 222, a decision 224 determines whether the media device playlist is unselected. When the media device playlist is unselected, the playlist management process 200 for the media device playlist ends. On the other hand, when the decision 224 determines that the media device playlist remains selected, the playlist management process 200 can return to repeat the decision 210 and subsequent operations so that management of the media device playlist can continue.

Figure 3:
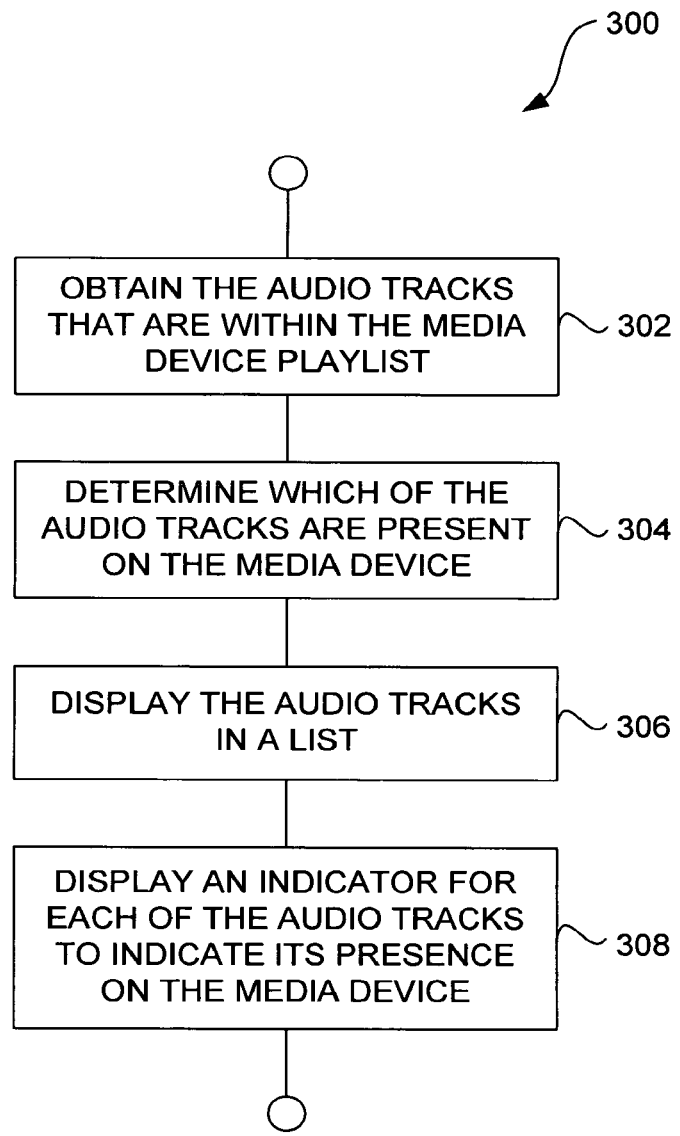
FIG. 3 is a flow diagram of a status indication process according to one embodiment of the invention.

FIG. 3 is a flow diagram of a status indication process 300 according to one embodiment of the invention. The status indication processed 300 represents additional processing that can be performed to provide status indication information for each of the audio tracks being listed in a media device playlist. The status indication process 300 is, for example, performed at block 208 of the playlist management process 200 illustrated in FIG. 2.

The status indication process 300 initially obtains 302 the audio tracks that are within the media device playlist. Then, the status indication process 300 determines 304 which of the audio tracks are present on the media device. The audio tracks can then be displayed 306 in a list on a display screen of the host computer. Additionally, an indicator for each of the audio tracks can be displayed 308 to indicate its presence on the media device. Following the block 308, the status indication processed 300 ends.

Often, all the audio tracks in the list being displayed 306 are also present in the media device. However, in various circumstances, one or more audio tracks are not present on the media device. As an example, if the media were disconnected before it could receive be updated with additional audio tracks, then the indicator displayed 308 at the host computer would indicate that such additional audio tracks are not present on the media device. As another example, if one audio track were added to the media device playlist at the host computer, but such audio track was not permitted to be copied elsewhere, then the indicator displayed 308 at the host computer would again indicate that such audio track was not present on the media device.

Figure 4:
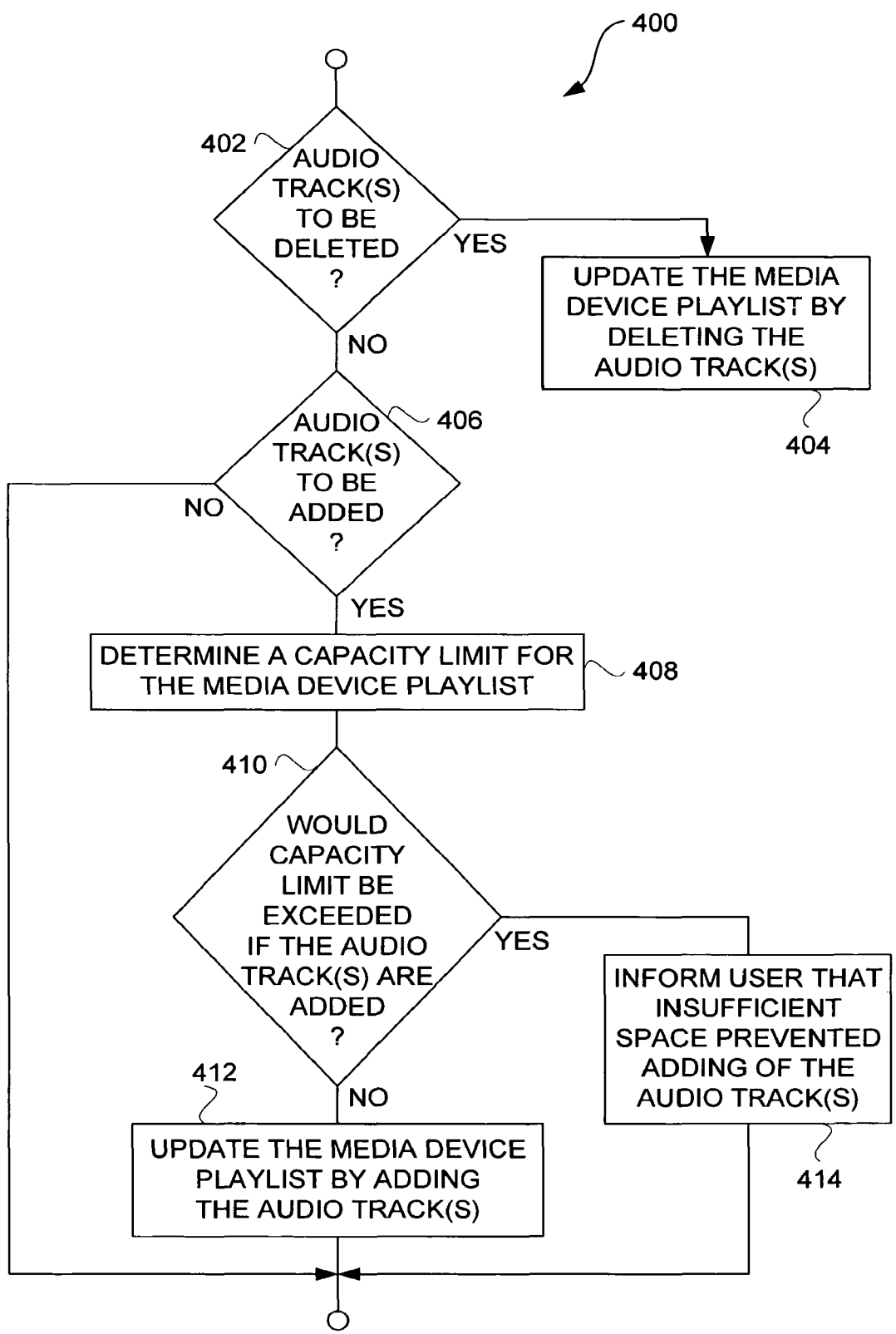
FIG. 4 is a flow diagram of an update process according to one embodiment of the invention.

FIG. 4 is a flow diagram of an update process 400 according to one embodiment of the invention. The update process 400 is performed by a host computer which serves to update the media device playlist stored on media device. The update process 400 represents one embodiment for the update 214 of the media device playlist discussed above with reference to FIG. 2.

The update process 400 begins with a decision 402 that determines whether one or more audio tracks are to be deleted from the media device playlist. When the decision 402 determines that one or more audio tracks are to be deleted from the media device playlist, then the media device playlist is updated 404 by deleting the one or more audio tracks. Following the block 404, or directly following the decision 402 when the decision 402 to determines that one or more audio tracks are not to be deleted, a decision 406 determines whether one or more audio tracks are to be added to the media device playlist. When the decision 406 determines that one or more audio tracks are to be added to the media device playlist, then a capacity limit for the media device playlist is determined 408. The capacity limit for the media device playlist can be established in a variety of different ways. In one embodiment, the capacity limit for the media device playlist is determined by the storage capacity of the media device. In another embodiment, the capacity limit for the media device playlist can be set by a user of the host computer, such as via a media management application operating on the host computer.

In any case, after the capacity limit for the media device playlist has been determined 408, a decision 410 determines whether the capacity limit would be exceeded if the one or more audio tracks are added to the media device playlist. When the decision 410 determines that the capacity limit would not be exceeded if the one or more audio tracks were added to the media device playlist, then the media device playlist can be updated 412 by adding the one or more audio tracks. Alternatively, when the decision 410 determines that the capacity limit for the media device playlist would be exceeded if the one or more audio tracks were added to the media device playlist, then the user can be informed 414 that insufficient space prevented adding of the one or more audio tracks to the media device playlist. Following the blocks 412 and 414, as well as following the decision 406 when no audio tracks are to be added, the update process 400 ends.

In another embodiment, the update process 400 can operate differently when the decision 410 determines that the capacity limit for the media device playlist would be exceeded if the one or more audio tracks were added to the media device playlist. For example, instead of merely informing 414 the user that insufficient space prevented adding of the one or more audio tracks to the media device playlist, the update process 400 could permit the additions at the host computer following the informing 414 which would provide a warning. However, in such an embodiment, the subsequent update 220 of the media device would not operate to copy excess media items to the media device. Status indicators, such as described above with reference to FIG. 3, could be used to designate the excess media items at the host computer's version of the media device playlist but not on the media device itself.

Figure 5:
FIG. 5 is a screen shot of a media management application window according to one embodiment of the invention.

FIG. 5 is a screen shot of a media management application window 500 according to one embodiment of the invention. The media management application window 500 is, for example, produced by a media management application operating on a host computer.

The media management application window 500 includes a source region 502 and a track listing area 504. The source region 502, among other things, depicts a media device indicator 506. The media device indicator 506 corresponds to a media device playlist. In this example, the media device indicator 506 is a graphic icon. Additionally, the media device indicator 506 can also include a text description. In this example, the media device indicator 506 also provides the text "iPod". The track listing area 504 includes a list of audio tracks 508 together with associated status indicators 510 and 511. The list of audio tracks 508 are those audio tracks associated with the media device playlist. As shown in FIG. 5, each of the audio tracks within the list of audio tracks 508 include a corresponding one of the status indicators 510. In this example, the status indicators 510 are all shown being "checked," thus indicating that the associated audio tracks are to be played when playing through the audio tracks within the list of audio tracks 508. Alternatively, with the status indicator 510 "unchecked" the associated audio track is skipped (i.e., not played) played when playing through the audio tracks within the list of audio tracks 508. Further, each of the audio tracks within the list of audio tracks 508 can also include a corresponding one of the status indicators 511. In this example, the status indicator 511 is being display adjacent to only the audio tracks 9, 10 and 11 of the list of audio tracks 508. The status indicator 511 in this example indicates that the corresponding audio track has not yet been copied to the associated media device. Typically, the media management application will copy all of the audio tracks within the list of audio tracks 508 to the media device once the media device connects to the host computer. However, in the event that certain ones of the audio tracks within the list of audio tracks 508 are not currently present on the media device, the status indicator 511 associated with the certain ones of the audio tracks would be displayed.

The track listing area 504 also presents certain information pertaining to each of the audio tracks. As shown in FIG. 5, the certain information can pertain to song name 514, duration of time of the audio track 514, artist name 516, and album name 518. Additionally, the track listing area 504 also includes "go to" links 520 and 522 for each of the audio tracks. Each of the "go to" links 520 direct the user to an album page for an album including the associated audio track (song). Each of the "go to" links 522 directs the user to an artist page associated with the artist identified by the artist name 516. As shown in FIG. 5, the "go to" links can be implemented as small buttons with arrow symbols therein.

Furthermore, as discussed below, the media management application window 500 further includes a fill control region 540. The fill control region 540 includes an Autofill button 542 that can be selected by a user. Additionally, the fill control region 540 provides graphical user interface control items that can be selected or manipulated by the user to affect the nature of an autofill operation once the Autofill button 542 is pressed. Namely, the fill control region 540 includes a source selector 544 so that a source of media from which the autofill operation is to be performed can be selected. In addition, the fill control region 540 includes selectors 546-550 that enable the user to select certain features. For example, the selector 546 allows a user to determine whether existing songs are to be replaced when autofilling the media device playlist. The selector 548 determines whether songs are to be randomly chosen when performing the autofill operation. The selector 550 determines whether higher-rated songs (e.g., user ratings) are to be chosen when performing the autofill operation. Still further, the fill control region 540 can display an indication 552 of an amount of available storage capacity for the media device.

In general, the autofill region 540 assists a user in providing criteria for media selection when autofilling. Although the fill control region 540 includes the selectors 548 and 550, different or additional selectors or other types of controls can be utilized. These additional controls can also be used to specify criteria for selecting audio tracks (i.e., songs) when autofilling the media device playlist. Some examples of these additional selectors or controls are associated with criteria such as: artist, album, composer, bit rate, date added (e.g., recently added), genre, play count, name, year, etc. A user can also define the rules or conditions for determining audio tracks to be selected when autofilling. The rules or conditions can include rule components, such as: contains, does not contain, is, is not, starts with, ends with, in the range, etc. Besides criteria controls and rules, importance selectors (e.g., sliders) or other controls permit a user to further control how the audio tracks are selected when autofilling. For example, a criteria selection based on user ratings as well as an importance value from an importance selector (e.g., slider) can be set to influence which audio tracks are to be selected from a source of media. However, the particular order in which such audio tracks are acquired can still be is partially randomly determined or can be determined based on the criteria (date added) or rules.

Figure 6:
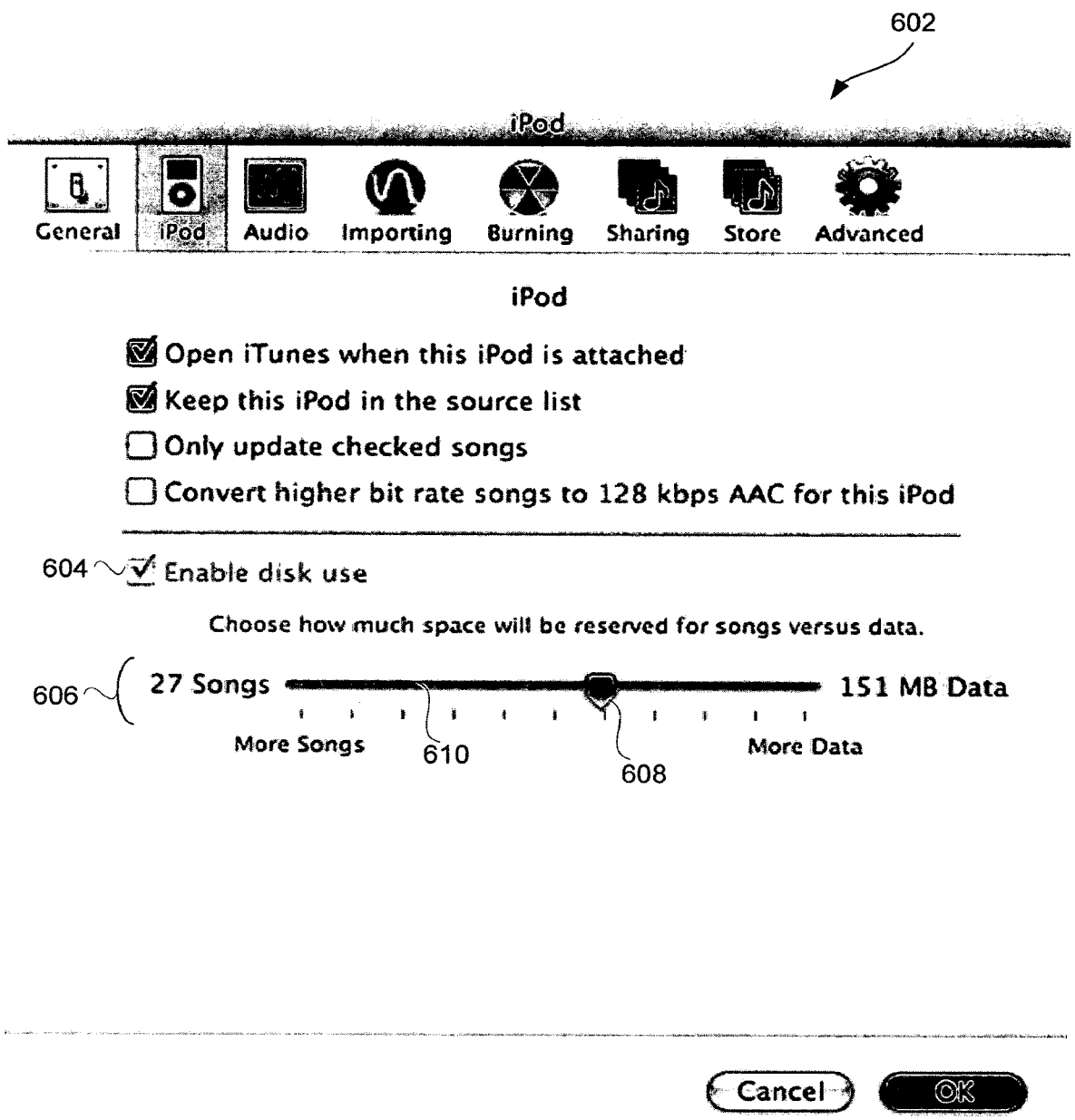
FIG. 6 is a screen shot of a preference window for a media management application according to one embodiment of the invention.

FIG. 6 is a screen shot of a preference window 602 for a media management application according to one embodiment of the invention. In this embodiment, the media management application is able to set preferences that determine how a media device operates to store data. Namely, in this example, the media device is known as the iPod® media player, which is available from Apple Computer, Inc. Here, the preference window 602 includes a selector 604 that enables the user to determine whether the media device is permitted to be used as a portable disk drive for data storage. Here, the data storage when being used as a portable storage disk would be distinct from storage of media content, such as media content of a media device playlist.

The preference window 602 also includes a graphical user interface control 606 that assists the user in specifying how much of the available storage capacity of the media device should be used for data as well as how much of the storage capacity should be used for media items, such as audio tracks or songs. In one embodiment, the graphical user interface control 606 is a slider such as shown in FIG. 6. The slider shown in FIG. 6 can be manipulated by the user to trade-off the number of media items (e.g., 27 songs) that can be stored to the media device with the amount of other data (e.g., 151 MB) that can be stored. As a slider reference 608 is manipulated by the user along a slider bar 610, the number of songs and the amount of data change. For example, if the user were to move the slider reference 608 to the left as shown in FIG. 6, the number of songs depicted would increase to a value greater than 27, while the amount of other data would decrease below 151 MB. For ease of computation, in one embodiment, each song can be considered 1 MB or some other predetermined representative size. Stated differently, the slider shown in FIG. 6 can be manipulated by the user to trade-off the amount of media item storage available on the media device with the amount of non-media item storage available on the media device.

Figure 7:
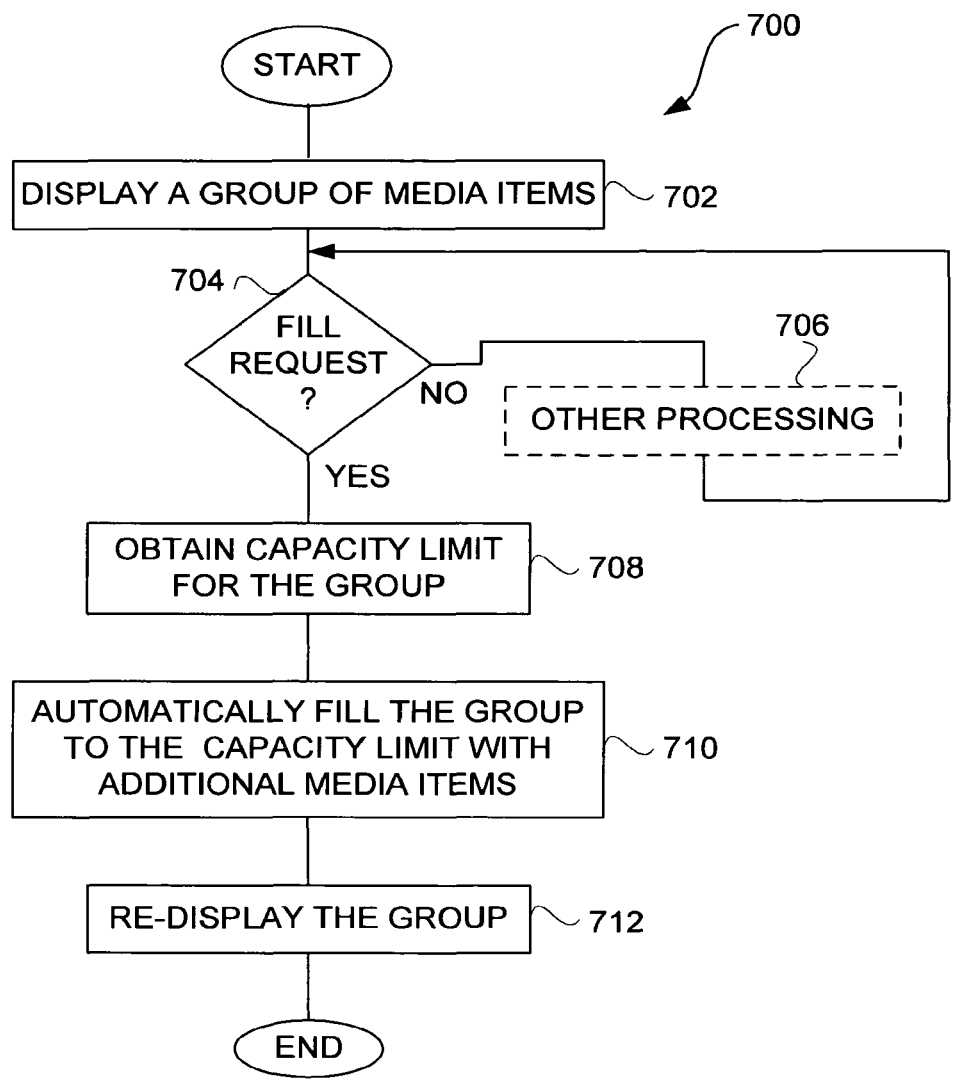
FIG. 7 if a flow diagram of a group fill process according to one embodiment of the invention.

FIG. 7 if a flow diagram of a group fill process 700 according to one embodiment of the invention. The group fill processed 700 is, for example, performed by a host computer that operates a media management application that is able to allow users to group media items.

The group fill process 700 initially displays 702 a group of media items. Next, a decision 704 determines whether a fill request has been received. When the decision 704 determines that a fill request has not been received, then other processing 706 can be optionally performed. In any case, the group fill process 700 returns to repeat the decision 704 to await a fill request.

Once the decision 704 determines that a fill request has been received, a capacity limit for the group is obtained 708. The capacity limit for the group can be stored on the host computer in one embodiment of the invention. In another embodiment, the capacity limit can be determined at the host computer. In still another embodiment, the capacity limit for the group can be determined based on information provided by a media device coupled to the host computer. In any event, after the capacity limit for the group has been obtained 708, the group fill process 700 operates to automatically fill 710 the group to the capacity limit with additional media items. At this point, the group of media items is deemed full of media items. It should be understood that "filling" the group of media items or consuming the capacity limit does not require that there be no remaining free capacity. For example, in one implementation, the automatic fill 710 can fill the group with as many complete media items as it can hold. In any case, following the automatic fill 710, the group can be re-displayed 712. Following the re-display 712 of the group, the group fill process 700 is complete. Although the group fill process 700 could end following the re-display 712 of the group, the group fill process 700 can also return to repeat the decision 704 and subsequent operations so that the group fill process can again performed (with or without any intermediate other processing).

One example of a group media items is a playlist. The media items within the playlist are, for example, audio tracks.

Figure 8A:
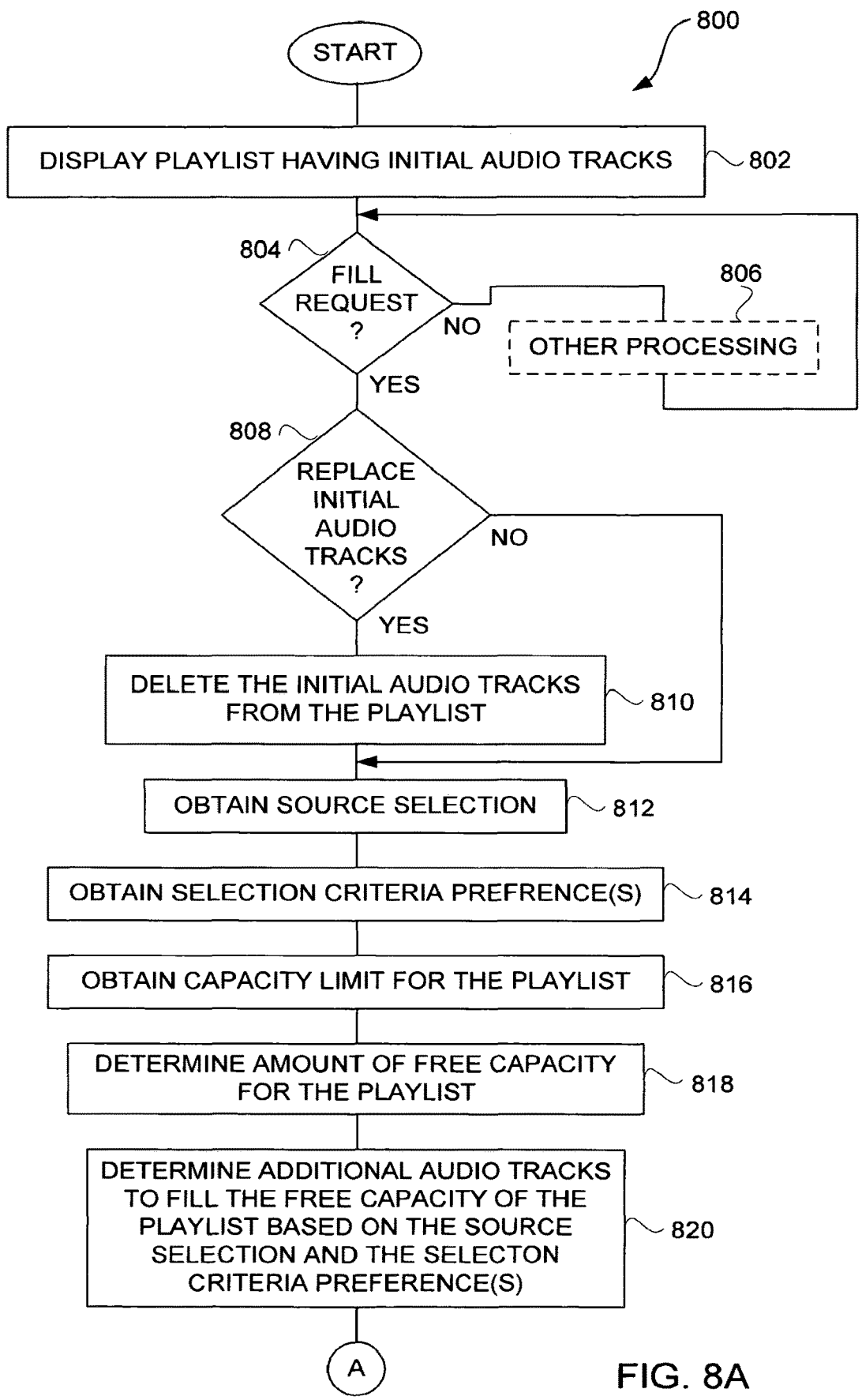
FIGS. 8A and 8B are flow diagrams of a playlist fill process according to one embodiment of the invention.
Figure 8B:
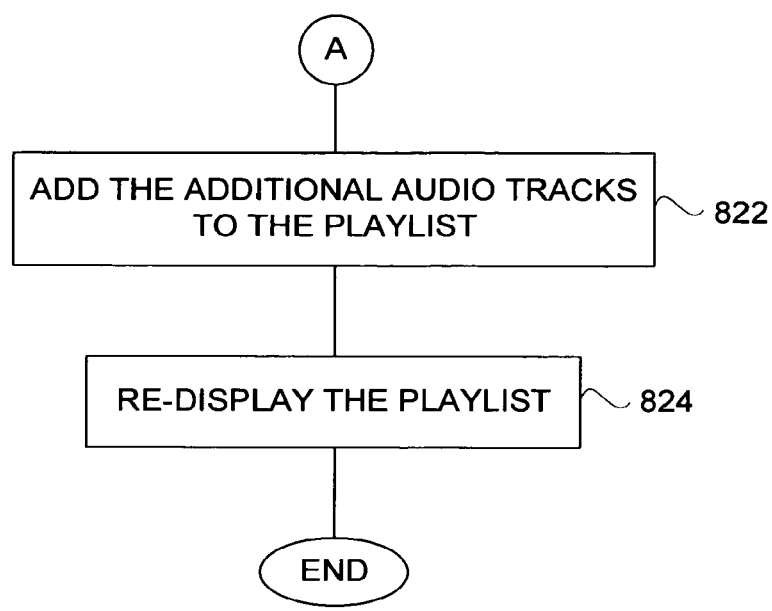

FIGS. 8A and 8B are flow diagrams of a playlist fill process 800 according to one embodiment of the invention. The playlist fill process 800 initially displays 802 a playlist having initial audio tracks. Next, a decision 804 determines whether a fill request has been received. Here, the fill request is typically from a user of a host computer that operates the playlist fill process 800. When the decision 804 determines that a fill request has not yet been received, other processing 806 can optionally be performed. Following the other processing 806, if any, the playlist fill process 800 returns to repeat the decision 804 and subsequent blocks.

Once the decision 804 determines that a fill request has been received, a decision 808 determines whether the initial audio tracks of the playlist are to be replaced. When the decision 808 determines that the initial audio tracks are to be replaced, the initial audio tracks are deleted 810 from the playlist. Alternatively, when the decision 808 determines that the initial audio tracks are not to be replaced, then the block 810 is bypassed.

Following the block 810, or its being bypassed, a source selection is obtained 812. The source selection represents a source for additional media items that can be added to the playlist. In addition, selection criteria preferences can be obtained 814. In one embodiment, the selection criteria preferences are preferences, typically set by the user, that specify criteria to be utilized in the selection of the additional media items to fill the playlist. Still further, a capacity limit for the playlist can be obtained 816. As noted above, the capacity limit can be influenced by user settings and/or media device capacities.

Next, an amount of free capacity for the playlist is determined 818. In one embodiment, the free capacity for the playlist represents in the difference between the current capacity for the playlist and the capacity limit for the playlist. Once the amount of free capacity has been determined 818, additional audio tracks to fill the free capacity of the playlist are determined 820 based on the source selection and the selection criteria preferences. Then, the additional audio tracks that have been determined 820 are added 822 to the playlist. Finally, the playlist can be re-displayed 824. Once re-displayed, the playlist is illustrated with a full complement of audio tracks.

Following the block 824, the playlist fill process 800 is complete and ends. However, it should be realized that the playlist fill process 800 can be repeated, if desired, so as to obtain different selections of audio tracks within the playlist, provided the source selection has an adequate quantity of audio tracks to be chosen from and provided at least some of the initial audio tracks are being replaced.

In another embodiment, the replacement (i.e., deletion 810) of initial tracks can be limited to those of the initial audio tracks that have been played since last updated with a host computer. In still another embodiment, the user of the host computer can manually delete one or more of the initial audio tracks from the playlist.

Figure 9:
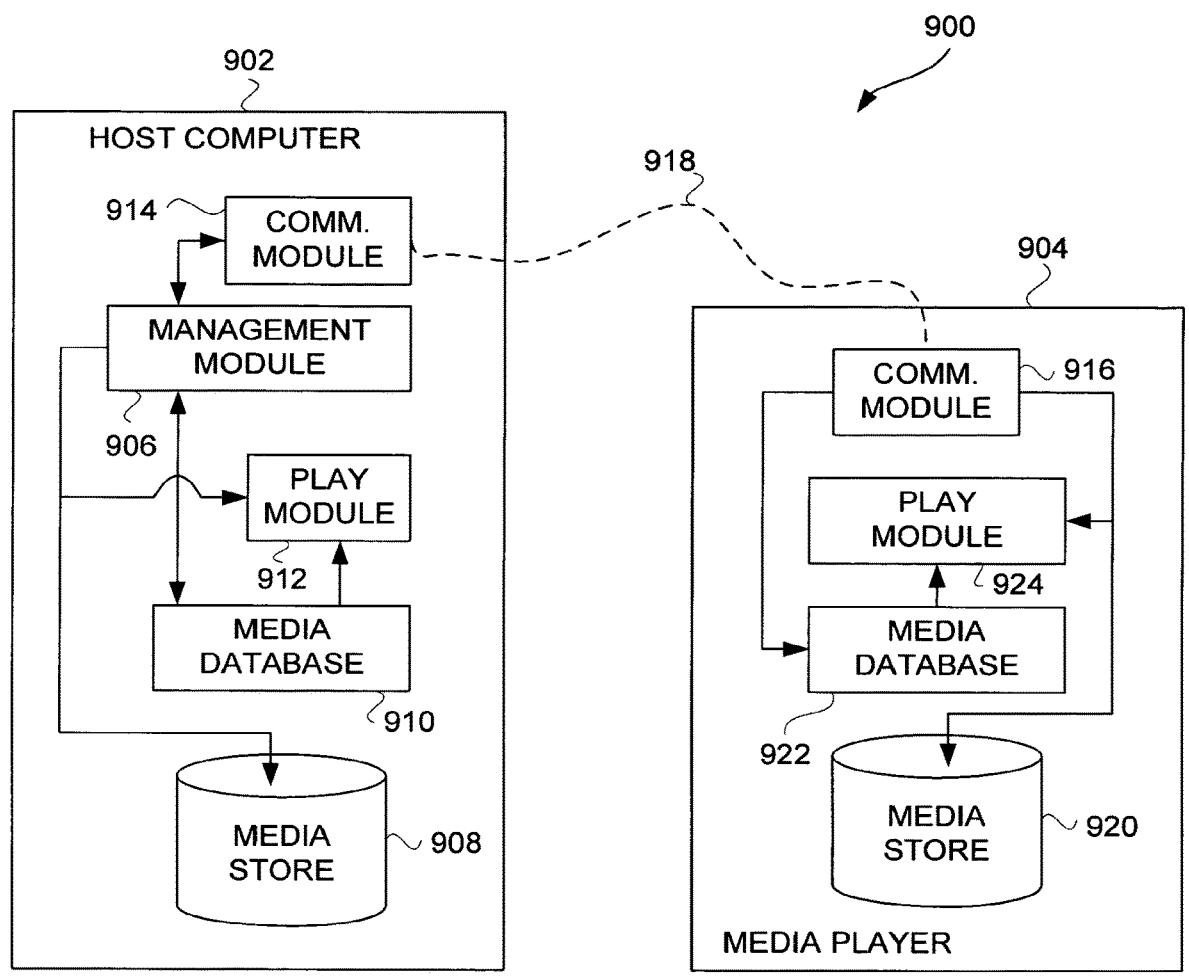
FIG. 9 is a block diagram of a media management system according to one embodiment of the invention.

FIG. 9 is a block diagram of a media management system 900 according to one embodiment of the invention. The media management system 900 includes a host computer 902 and a media player 904. The host computer 902 is typically a personal computer. The host computer, among other conventional components, includes a management module 906 which is a software module. The management module 906 provides for centralized management of media items (and/or playlists) not only on the host computer 902 but also on the media player 904. More particularly, the management module 906 manages those media items stored in a media store 908 associated with the host computer 902. The management module 906 also interacts with a media database 910 to store media information associated with the media items stored in the media store 908.

The media information pertains to characteristics or attributes of the media items. For example, in the case of audio or audiovisual media, the media information can include one or more of: title, album, track, artist, composer and genre. These types of media information are specific to particular media items. In addition, the media information can pertain to quality characteristics of the media items. Examples of quality characteristics of media items can include one or more of: bit rate, sample rate, equalizer setting, volume adjustment, start/stop and total time.

Still further, the host computer 902 includes a play module 912. The play module 912 is a software module that can be utilized to play certain media items stored in the media store 908. The play module 912 can also display (on a display screen) or otherwise utilize media information from the media database 910. Typically, the media information of interest corresponds to the media items to be played by the play module 912.

The host computer 902 also includes a communication module 914 that couples to a corresponding communication module 916 within the media player 904. A connection or link 918 removeably couples the communication modules 914 and 916. In one embodiment, the connection or link 918 is a cable that provides a data bus, such as a FIREWIRE™ bus or USB bus, which is well known in the art. In another embodiment, the connection or link 918 is a wireless channel or connection through a wireless network. Hence, depending on implementation, the communication modules 914 and 916 may communicate in a wired or wireless manner.

The media player 904 also includes a media store 920 that stores media items within the media player 904. Optionally, the media store 920 can also store data, i.e., non-media item storage. The media items being stored to the media store 920 are typically received over the connection or link 918 from the host computer 902. More particularly, the management module 906 sends all or certain of those media items residing on the media store 908 over the connection or link 918 to the media store 920 within the media player 904. Additionally, the corresponding media information for the media items that is also delivered to the media player 904 from the host computer 902 can be stored in a media database 922. In this regard, certain media information from the media database 910 within the host computer 902 can be sent to the media database 922 within the media player 904 over the connection or link 918. Still further, playlists identifying certain of the media items can also be sent by the management module 906 over the connection or link 918 to the media store 920 or the media database 922 within the media player 904.

Furthermore, the media player 904 includes a play module 924 that couples to the media store 920 and the media database 922. The play module 924 is a software module that can be utilized to play certain media items stored in the media store 920. The play module 924 can also display (on a display screen) or otherwise utilize media information from the media database 922. Typically, the media information of interest corresponds to the media items to be played by the play module 924.

Hence, in one embodiment, the media player 904 has limited or no capability to manage media items on the media player 904. However, the management module 906 within the host computer 902 can indirectly manage the media items residing on the media player 904. For example, to "add" a media item to the media player 904, the management module 906 serves to identify the media item to be added to the media player 904 from the media store 908 and then causes the identified media item to be delivered to the media player 904. As another example, to "delete" a media item from the media player 904, the management module 906 serves to identify the media item to be deleted from the media store 908 and then causes the identified media item to be deleted from the media player 904. As still another example, if changes (i.e., alterations) to characteristics of a media item were made at the host computer 902 using the management module 906, then such characteristics can also be carried over to the corresponding media item on the media player 904. In one implementation, the additions, deletions and/or changes occur in a batch-like process during synchronization of the media items on the media player 904 with the media items on the host computer 902.

In another embodiment, the media player 904 has limited or no capability to manage playlists on the media player 904. However, the management module 906 within the host computer 902 through management of the playlists residing on the host computer can indirectly manage the playlists residing on the media player 904. In this regard, additions, deletions or changes to playlists can be performed on the host computer 902 and then by carried over to the media player 904 when delivered thereto.

As previously noted, synchronization is a form of media management. The ability to automatically initiate synchronization was also previously discussed above and in the related application noted above. Still further, however, the synchronization between devices can be restricted so as to prevent automatic synchronization when the host computer and media player do not recognize one another.

According to one embodiment, when a media player is first connected to a host computer (or even more generally when matching identifiers are not present), the user of the media player is queried as to whether the user desires to affiliate, assign or lock the media player to the host computer. When the user of the media player elects to affiliate, assign or lock the media player with the host computer, then a pseudo-random identifier is obtained and stored in either the media database or a file within both the host computer and the media player. In one implementation, the identifier is an identifier associated with (e.g., known or generated by) the host computer or its management module and such identifier is sent to and stored in the media player. In another implementation, the identifier is associated with (e.g., known or generated by) the media player and is sent to and stored in a file or media database of the host computer.

Figure 10:
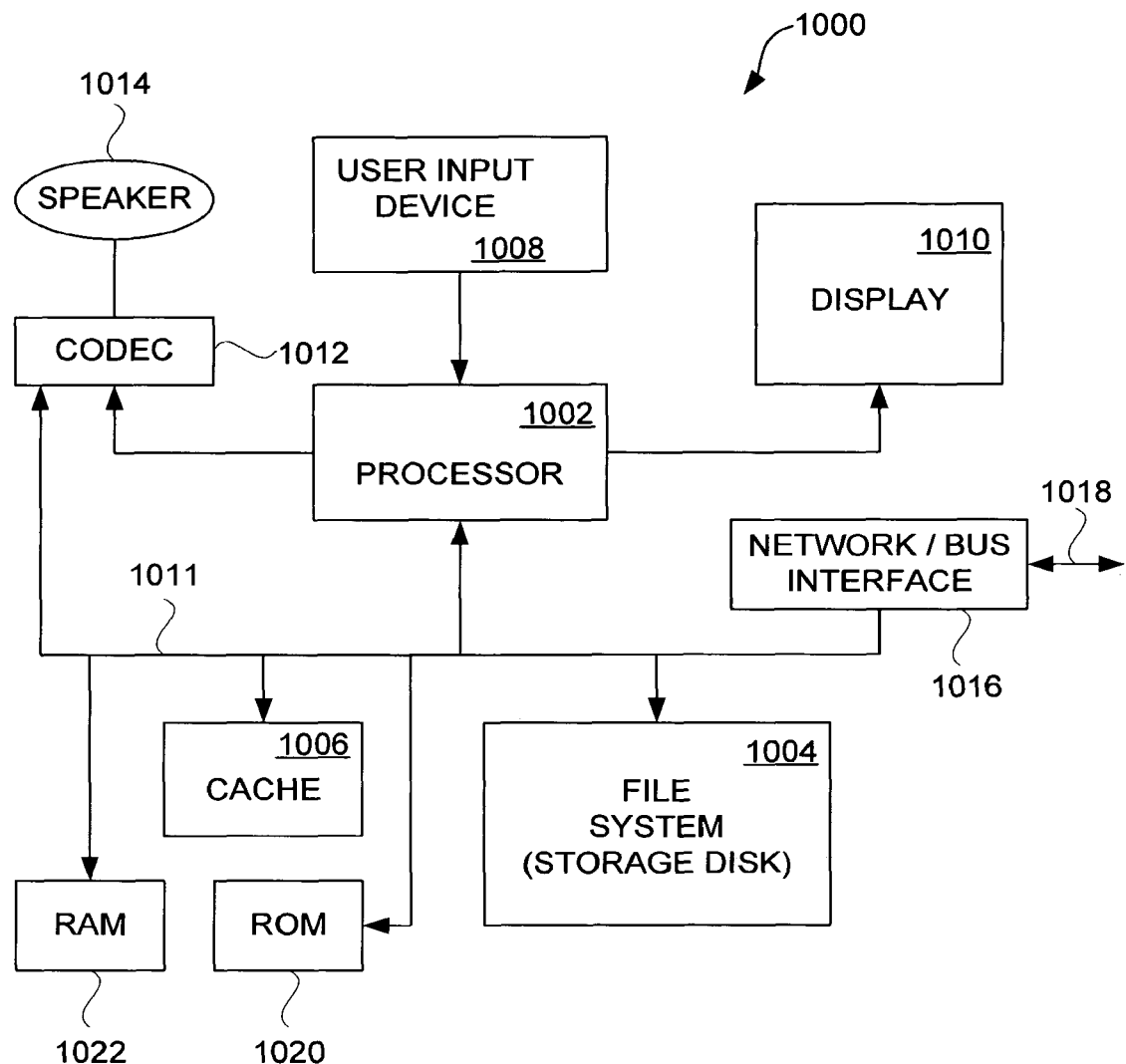
FIG. 10 is a block diagram of a media player according to one embodiment of the invention.

FIG. 10 is a block diagram of a media player 1000 according to one embodiment of the invention. The media player 1000 includes a processor 1002 that pertains to a microprocessor or controller for controlling the overall operation of the media player 1000. The media player 1000 stores media data pertaining to media items in a file system 1004 and a cache 1006. The file system 1004 is, typically, a storage disk or a plurality of disks. The file system 1004 typically provides high capacity storage capability for the media player 1000. The file system 1004 can store not only media data but also non-media data (e.g., when operated in a disk mode). However, since the access time to the file system 1004 is relatively slow, the media player 1000 can also include a cache 1006. The cache 1006 is, for example, Random-Access Memory (RAM) provided by semiconductor memory. The relative access time to the cache 1006 is substantially shorter than for the file system 1004. However, the cache 1006 does not have the large storage capacity of the file system 1004. Further, the file system 1004, when active, consumes more power than does the cache 1006. The power consumption is often a concern when the media player 1000 is a portable media player that is powered by a battery (not shown). The media player 1000 also includes a RAM 1020 and a Read-Only Memory (ROM) 1022. The ROM 1022 can store programs, utilities or processes to be executed in a non-volatile manner. The RAM 1020 provides volatile data storage, such as for the cache 1006.

The media player 1000 also includes a user input device 1008 that allows a user of the media player 1000 to interact with the media player 1000. For example, the user input device 1008 can take a variety of forms, such as a button, keypad, dial, etc. Still further, the media player 1000 includes a display 1010 (screen display) that can be controlled by the processor 1002 to display information to the user. A data bus 1011 can facilitate data transfer between at least the file system 1004, the cache 1006, the processor 1002, and the CODEC 1012.

In one embodiment, the media player 1000 serves to store a plurality of media items (e.g., songs) in the file system 1004. When a user desires to have the media player play a particular media item, a list of available media items is displayed on the display 1010. Then, using the user input device 1008, a user can select one of the available media items. The processor 1002, upon receiving a selection of a particular media item, supplies the media data (e.g., audio file) for the particular media item to a coder/decoder (CODEC) 1012. The CODEC 1012 then produces analog output signals for a speaker 1014. The speaker 1014 can be a speaker internal to the media player 1000 or external to the media player 1000. For example, headphones or earphones that connect to the media player 1000 would be considered an external speaker.

The media player 1000 also includes a network/bus interface 1016 that couples to a data link 1018. The data link 1018 allows the media player 1000 to couple to a host computer. The data link 1018 can be provided over a wired connection or a wireless connection. In the case of a wireless connection, the network/bus interface 1016 can include a wireless transceiver.

In one implementation, the host computer can utilize an application resident on the host computer to permit utilization and provide management for playlists, including a media device playlist. One such application is iTunes®, version 4.2, produced by Apple Computer, Inc. of Cupertino, Calif.

Although the media items (or media assets) of emphasis in several of the above embodiments were audio items (e.g., audio files or songs), the media items are not limited to audio items. For example, the media items can alternatively pertain to videos (e.g., movies) or images (e.g., photos).

The various aspects, embodiments, implementations or features of the invention can be used separately or in any combination.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that a media device playlist can be persistently represented and manipulated at a host computer regardless of whether the associated media device is connected to the host computer. Another advantage of the invention is that a playlist can be managed in accordance with a capacity limit. Still another advantage of the invention is that a capacity limit to be imposed on a playlist can be adjusted to provide reserved storage capacity for data storage (e.g., associated with a disk mode usage of the media device). Yet still another advantage of the invention is that a user can initiate a fill operation to cause a playlist to be automatically filled from a larger media source.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method comprising:
presenting, via a computing device, a media application interface;
presenting, in the media application interface, a media presentation region for concurrently presenting two or more media items, a first media item and a second media item, wherein the first media item and the second media item are associated with a media source;
presenting, in the media presentation region, a first graphical element associated with the first media item indicating that the first media item is stored locally and not presenting the first graphical element in accordance with the second media item being stored remotely;
presenting, in the media application interface, one or more selectable graphical control items for managing local storage of media items selected from the media presentation region;
receiving user input selecting a graphical control item from the one or more selectable graphical control items; and
based on the user input, presenting the first graphical element associated with the second media item indicating that the second media item is stored locally.

2. The method of claim 1, further comprising:
based on a first triggering event, limiting media items presented in the media presentation region to locally stored media items only; and
based on a second triggering event, enabling media items presented in the media presentation region to include media items that are not locally stored.

3. The method of claim 1, wherein the first graphical elements comprises an indicator displayed proximate to a respective media item presented in the media application interface to visually indicate whether the respective media item is stored on the computing device.

4. The method of claim 1, wherein the one or more media items presented on the media presentation region comprise at least one locally stored media item and at least one media item stored remotely.

5. The method of claim 1, further comprising:
presenting, in the media application interface, an indication of an amount of available storage capacity for the computing device.

6. The method of claim 1, further comprising:
presenting, in the media application interface, a selectable graphical control item for converting a bit rate of a media item to be stored locally.

7. A system comprising:
one or more processors; and
at least one non-transitory computer-readable storage medium having stored therein instructions which, when executed by the one or more processors, cause the system to:
present a media application interface;
present, in the media application interface, a media presentation region for concurrently presenting two or more media items, a first media item and a second media item, wherein the first media item and the second media item are associated with a media source;
present, in the media presentation region, a first graphical element associated with the first media item indicating that the first media item is stored locally and not presenting the first graphical element in accordance with the second media item being stored remotely;
present, in the media application interface, one or more selectable graphical control items for managing local storage of media items selected from the media presentation region;
receive user input selecting a graphical control item from the one or more selectable graphical control items; and
based on the user input, presenting the first graphical element associated with the second media item indicating that the second media item is stored locally.

8. The system of claim 7, wherein the at least one computer-readable storage medium stores additional instructions which, when executed by the one or more processors, cause the system to:
based on a first triggering event, limit media items presented in the media presentation region to locally stored media items only; and
based on a second triggering event, enable media items presented in the media presentation region to include media items that are not locally stored.

9. The system of claim 7, wherein the first graphical elements comprises an indicator displayed proximate to a respective media item presented in the media application interface to visually indicate whether the respective media item is stored locally.

10. The system of claim 7, wherein the two or more media items presented on the media presentation region comprise at least one locally stored media item and at least one media item stored remotely.

11. The system of claim 7, wherein the at least one computer-readable storage medium stores additional instructions which, when executed by the one or more processors, cause the system to present, in the media application interface, an indication of an amount of available storage capacity for the computing device.

12. The system of claim 7, wherein the at least one computer-readable storage medium stores additional instructions which, when executed by the one or more processors, cause the system to present, in the media application interface, a selectable graphical control item for converting a bit rate of a media item to be stored locally.

13. A non-transitory computer-readable storage medium comprising:
instructions stored therein which, when executed by one or more processors of a computing device, cause the one or more processors to:
present a media application interface;
present, in the media application interface, a media presentation region for concurrently presenting two or more media items, a first media item and a second media item, wherein the first media item and the second media item are associated with a media source;
present, in the media presentation region, a first graphical element associated with the first media item indicating that the first media item is stored locally and not presenting the first graphical element in accordance with the second media item being stored remotely;
present, in the media application interface, one or more selectable graphical control items for managing local storage of media items selected from the media presentation region;
receive user input selecting a graphical control item from the one or more selectable graphical control items; and
based on the user input, presenting the first graphical element associated with the second media item indicating that the second media item is stored locally.

14. The non-transitory computer-readable storage medium of claim 13, storing additional instructions which, when executed by the one or more processors, cause the one or more processors to:
based on a first triggering event, limit media items presented in the media presentation region to locally stored media items; and
based on a second triggering event, enable media items presented in the media presentation region to include media items that are not locally stored.

15. The non-transitory computer-readable storage medium of claim 13, storing additional instructions which, when executed by the one or more processors, cause the one or more processors to present, in the media application interface, a selectable graphical control item for converting a bit rate of a media item to be stored locally.

16. The non-transitory computer-readable storage medium of claim 13, wherein the first graphical elements comprises an indicator displayed proximate to a respective media item presented in the media application interface to visually indicate whether the respective media item is stored on the computing device.

* * * * *

UNITED STATES PATENT AND TRADEMARK OFFICE
CERTIFICATE OF CORRECTION

PATENT NO. : 11,314,378 B2
APPLICATION NO. : 15/202398
DATED : April 26, 2022
INVENTOR(S) : Steven P. Jobs et al.

It is certified that error appears in the above-identified patent and that said Letters Patent is hereby corrected as shown below:

In the Claims

Claim 4, at Column 15, Line 14 - replace "one or more media" with -- two or more media --

Signed and Sealed this
Twenty-first Day of June, 2022

Katherine Kelly Vidal
*Director of the United States Patent and Trademark Office*